US011690104B2

(12) United States Patent
Taherzadeh Boroujeni et al.

(10) Patent No.: US 11,690,104 B2
(45) Date of Patent: *Jun. 27, 2023

(54) MESSAGE REPETITION CONFIGURATIONS FOR RANDOM ACCESS PROCEDURES

(71) Applicant: QUALCOMM INCORPORATED, San Diego, CA (US)

(72) Inventors: Mahmoud Taherzadeh Boroujeni, San Diego, CA (US); Yan Zhou, San Diego, CA (US); Tao Luo, San Diego, CA (US); Sony Akkarakaran, Poway, CA (US); Hung Dinh Ly, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/248,505

(22) Filed: Jan. 27, 2021

(65) Prior Publication Data

US 2021/0235510 A1 Jul. 29, 2021

Related U.S. Application Data

(60) Provisional application No. 62/967,476, filed on Jan. 29, 2020.

(51) Int. Cl.
*H04W 4/00* (2018.01)
*H04W 74/08* (2009.01)
(Continued)

(52) U.S. Cl.
CPC .......... *H04W 74/0833* (2013.01); *H04L 1/18* (2013.01); *H04W 72/0446* (2013.01); *H04W 72/23* (2023.01)

(58) Field of Classification Search
CPC .......... H04W 74/0833; H04W 72/042; H04W 72/0446; H04L 1/18; H04L 5/0092
See application file for complete search history.

(56) References Cited

U.S. PATENT DOCUMENTS 11,343,857 B2 * 5/2022 Taherzadeh Boroujeni ................ H04W 56/005
2017/0215207 A1 * 7/2017 Yi ...................... H04W 72/0446
(Continued)

FOREIGN PATENT DOCUMENTS

EP 3200543 A1 8/2017
WO 2013107036 A1 7/2013

OTHER PUBLICATIONS

CATT: "Consideration on Random Access for R13 eMTC", 3GPP Draft, 3GPP TSG RAN WG2 Meeting #91, R2-153485_RACH for R13 EMTC, 3rd Generation Partnership Project (3GPP), Mobile Competence Centre, 650, Route Des Lucioles, F-06921, Sophia-Antipolis Cedex, France, vol. RAN WG2, No. Beijing, China; Aug. 24, 2015-Aug. 28, 2015, Aug. 23, 2015 (Aug. 23, 2015), XP051004199, 5 pages, Retrieved from the Internet: URL: http://www.3gpp.org/ftp/Meetings_3GPP_SYNC/RAN2/Docs/ [retrieved on Aug. 23, 2015] Msg2—RAR transmission; p. 2, paragraph 2.2.
(Continued)

*Primary Examiner* — Abdelnabi O Musa
(74) *Attorney, Agent, or Firm* — Danai Nelisile Mhembere; Haynes and Boone, LLP

(57) ABSTRACT

Methods, systems, and devices for wireless communications are described. In some systems, a user equipment (UE) may attempt to connect to a base station using a random access procedure. During the random access procedure, the base station may transmit control information associated with a random access response (RAR) during a RAR window. The UE may attempt to receive a single instance of the control information and, in some cases, may be unable to receive
(Continued)

and decode the single instance of the control information. The base station may configure one or more RAR windows (or segment(s) thereof) to support transmitting repeating instances of the control information and/or RAR. The UE may identify a quantity of instances of the repeated control information and combine the instances. The UE may successfully decode the combined instances of control information and identify a location for receiving the RAR.

29 Claims, 17 Drawing Sheets

(51) Int. Cl.
*H04L 1/18* (2023.01)
*H04W 72/0446* (2023.01)
*H04W 72/23* (2023.01)

(56) References Cited

U.S. PATENT DOCUMENTS

| | | | |
|---|---|---|---|
| 2017/0280481 A1* | 9/2017 | Stern-Berkowitz | ......................... H04L 1/1854 |
| 2017/0290064 A1* | 10/2017 | Liu | ................... H04W 74/0833 |
| 2018/0212736 A1* | 7/2018 | Chatterjee | ............. H04W 48/12 |
| 2019/0053272 A1* | 2/2019 | Tsai | ................... H04W 74/0833 |
| 2019/0132882 A1* | 5/2019 | Li | ..................... H04W 74/0816 |
| 2020/0112996 A1* | 4/2020 | Pan | ................... H04W 72/0453 |
| 2020/0413451 A1* | 12/2020 | Taherzadeh Boroujeni | ............... H04W 74/004 |
| 2021/0234637 A1 | 7/2021 | Taherzadeh Boroujeni et al. | |

OTHER PUBLICATIONS

International Search Report and Written Opinion—PCT/US2021/015581—ISA/EPO—dated May 12, 2021.

* cited by examiner

MESSAGE REPETITION CONFIGURATIONS FOR RANDOM ACCESS PROCEDURES

CROSS-REFERENCE TO RELATED APPLICATIONS

The present application claims priority to and the benefit of U.S. Provisional Application No. 62/967,476, filed Jan. 29, 2020, which is hereby incorporated by reference in its entirety as if fully set forth below and for all applicable purposes.

FIELD OF TECHNOLOGY

The following relates generally to wireless communications and more specifically to message repetition configurations for random access procedures.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (1-DMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The described techniques relate to improved methods, systems, devices, and apparatuses that support message repetition for random access procedure. Generally, the described techniques provide for a more robust random access procedure between a user equipment (UE) and a base station. In some instances, the techniques are utilized when a communication link between the UE and the base station is in a low connectivity condition (e.g., associated with a low link budget threshold or low signal-to-noise ratio (SNR)). In other instances, the techniques are utilized in the normal course of communication, including in normal and strong connectivity conditions. In some wireless communications systems, a UE may attempt to connect to a base station using a random access procedure and may transmit a random access request to the base station. The base station may respond to the random access request by transmitting, to the UE, control information associated with a random access response (RAR) during a RAR window. The base station may transmit an indication of a RAR window configuration. The RAR window configuration may indicate one or more first segments of a RAR window support a single instance of control information and indicate one or more second segments of the RAR window support repeated instances of the control information.

The base station may determine based on a RAR window configuration whether a current segment of the RAR window supports a single instance of control information or supports repeated instances of control information. Based on the determination, the base station may transmit either a single instance of control information or repeated instances of control information during the current segment. Accordingly, during one or more segments of the RAR window, the base station may transmit the control information without repetition, while, during one or more other segments of the RAR window, the base station may transmit the control information with repetition according to a configuration of the RAR window.

When the base station transmits a single instance of control information, the UE may receive the single transmission of the control information, decode the control information, and perform a parity check. The UE may identify a location for receiving the RAR based on the decoded, single instance of control information. When the base station transmits repeated instances of control information, the UE may receive a plurality of the repeated transmissions of the control information, including all of the repeated transmission in some instances. The UE may combine the multiple received transmissions (e.g., via soft combining) prior to decoding and perform a parity check. The UE may identify a location for receiving the RAR based on the decoded combination of the multiple received transmissions of the control information.

The RAR window configuration may indicate one or more segments of a RAR window support a single instance of a RAR message and indicate one or more segments of the RAR window support repeated instances of the RAR message. The base station may determine based on a RAR window configuration whether a current segment of the RAR window supports a single instance of the RAR message or supports repeated instances of the RAR message. Based on the determination, the base station may transmit either a single instance of the RAR message or repeated instances of the RAR message during the current segment. Accordingly, during one or more segments of the RAR window, the base station may transmit a RAR message without repetition, while, during one or more other segments of the RAR window, the base station may transmit the RAR message with repetition according to a configuration of the RAR window.

When the base station transmits a single instance of the RAR message, the UE may receive and decode the single transmission of the RAR message. The UE may transmit a message 3 (e.g., a radio resource control (RRC) connection request) to the base station based on the decoded RAR message and the random access procedure may advance. When the base station transmits repeated instances of the RAR message, the UE may receive one or more of the repeated transmissions of the RAR message, including all of the repeated transmission in some instances. The UE may decode a single received RAR message and/or combine the multiple received transmissions (e.g., via soft combining) prior to decoding. The UE may transmit the message 3 (e.g., RRC connection request) to the base station based on the decoded RAR message, whether based on a single instance or multiple instances of the RAR message.

A method for wireless communication at a user equipment is described. The method may include receiving, from a base station, an indication of a random access response (RAR) window configuration, the RAR window configuration indicating one or more first segments of a RAR window support a single instance of control information and indicating one or more second segments of the RAR window support repeated instances of the control information; determining, based on the RAR window configuration, whether a random access procedure is operating within the one or more first segments of the RAR window or operating within the one or more second segments; and monitoring, based on the determining, one or more slots of the RAR window for the single instance of the control information or the repeated instances of the control information.

A method for wireless communication at a base station is described. The method may include transmitting an indication of a random access response (RAR) window configuration, the RAR window configuration indicating one or more first segments of a RAR window support a single instance of control information and indicating one or more second segments of the RAR window support repeated instances of the control information; determining, based on the RAR window configuration, whether a random access procedure is operating within the one or more first segments of the RAR window or operating within the one or more second segments; and transmitting, based on the determining, the single instance of the control information or the repeated instances of the control information in one or more slots of the RAR window.

An apparatus for wireless communication at a user equipment is described. The apparatus may include a processor, memory in electronic communication with the processor, and instructions stored in the memory and executable by the processor to cause the apparatus to: receive, from a base station, an indication of a random access response (RAR) window configuration, the RAR window configuration indicating one or more first segments of a RAR window support a single instance of control information and indicating one or more second segments of the RAR window support repeated instances of the control information; determine, based on the RAR window configuration, whether a random access procedure is operating within the one or more first segments of the RAR window or operating within the one or more second segments; and monitor, based on the determining, one or more slots of the RAR window for the single instance of the control information or the repeated instances of the control information.

An apparatus for wireless communication at a base station is described. The apparatus may include a processor, memory in electronic communication with the processor, and instructions stored in the memory and executable by the processor to cause the apparatus to: transmit an indication of a random access response (RAR) window configuration, the RAR window configuration indicating one or more first segments of a RAR window support a single instance of control information and indicating one or more second segments of the RAR window support repeated instances of the control information; determine, based on the RAR window configuration, whether a random access procedure is operating within the one or more first segments of the RAR window or operating within the one or more second segments; and transmit, based on the determining, the single instance of the control information or the repeated instances of the control information in one or more slots of the RAR window.

An apparatus for wireless communication at a user equipment is described. The apparatus may include means for receiving, from a base station, an indication of a random access response (RAR) window configuration, the RAR window configuration indicating one or more first segments of a RAR window support a single instance of control information and indicating one or more second segments of the RAR window support repeated instances of the control information; means for determining, based on the RAR window configuration, whether a random access procedure is operating within the one or more first segments of the RAR window or operating within the one or more second segments; and means for monitoring, based on the determining, one or more slots of the RAR window for the single instance of the control information or the repeated instances of the control information.

An apparatus for wireless communication at a base station is described. The apparatus may include means for transmitting an indication of a random access response (RAR) window configuration, the RAR window configuration indicating one or more first segments of a RAR window support a single instance of control information and indicating one or more second segments of the RAR window support repeated instances of the control information; means for determining, based on the RAR window configuration, whether a random access procedure is operating within the one or more first segments of the RAR window or operating within the one or more second segments; and means for transmitting, based on the determining, the single instance of the control information or the repeated instances of the control information in one or more slots of the RAR window.

A non-transitory computer-readable medium storing code for wireless communication at a user equipment is described. The code may include instructions executable by a processor to receive, from a base station, an indication of a random access response (RAR) window configuration, the RAR window configuration indicating one or more first segments of a RAR window support a single instance of control information and indicating one or more second segments of the RAR window support repeated instances of the control information; determine, based on the RAR window configuration, whether a random access procedure is operating within the one or more first segments of the RAR window or operating within the one or more second segments; and monitor, based on the determining, one or more slots of the RAR window for the single instance of the control information or the repeated instances of the control information.

A non-transitory computer-readable medium storing code for wireless communication at a base station is described. The code may include instructions executable by a processor to transmit an indication of a random access response (RAR) window configuration, the RAR window configuration indicating one or more first segments of a RAR window support a single instance of control information and indicating one or more second segments of the RAR window support repeated instances of the control information; determine, based on the RAR window configuration, whether a random access procedure is operating within the one or more first segments of the RAR window or operating within the one or more second segments; and transmit, based on the determining, the single instance of the control information or the repeated instances of the control information in one or more slots of the RAR window.

Other aspects, features, and examples of the present invention will become apparent to those of ordinary skill in the art, upon reviewing the following description of specific, exemplary examples of the present invention in conjunction with the accompanying figures. While features of the present invention may be discussed relative to certain examples and figures below, various implementations of the present invention can include one or more of the advantageous features discussed herein. In other words, while one or more examples may be discussed as having certain advantageous features, one or more of such features may also be used in accordance with the various other examples of the invention discussed herein. In similar fashion, while exemplary examples may be discussed below as device, system, or method examples it should be understood that such exemplary examples can be implemented in various devices, systems, and methods.

DETAILED DESCRIPTION

Figure 1:
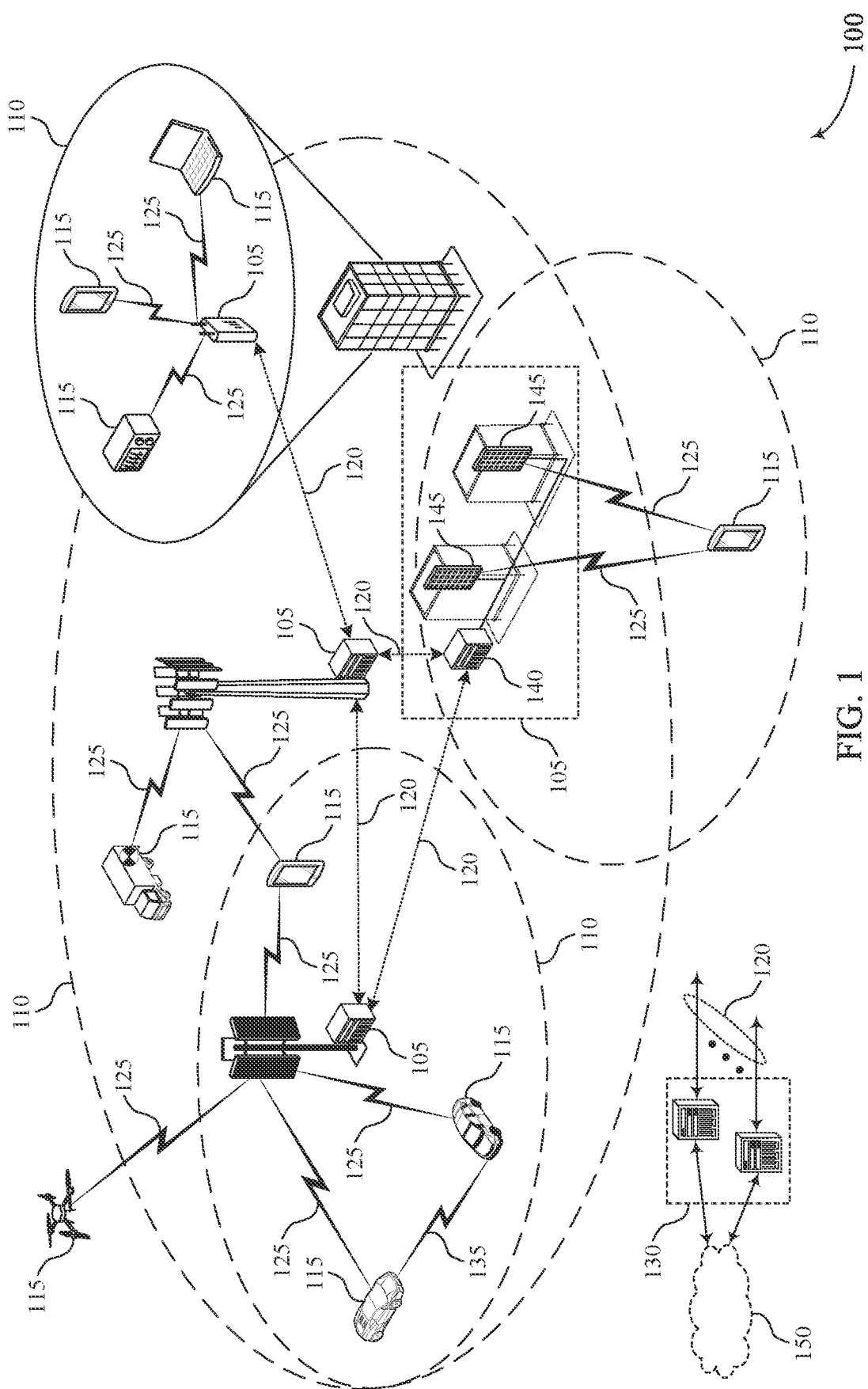
FIG. 1 illustrates an example of a system for wireless communications that supports message repetition for a random access procedure in accordance with aspects of the present disclosure.

A first device, such as a user equipment (UE), may attempt to connect to a second device, such as a base station, using a random access procedure. A communication link between the first device and the second device may be associated with a link budget (e.g., a link budget threshold or link margin), which may be based on a number of transmission parameters and environmental factors. As demand for communication resources increases due to an increasing number of wireless devices communicating over the available spectrum, techniques to efficiently and reliably increase throughput are desirable. In some cases, additional frequency ranges may be used by communicating devices, which may enable devices to achieve higher throughput. Higher frequency ranges (e.g., such as frequency ranges used in FR2, including millimeter wave (mmW) frequency ranges) may be implemented for wireless communications, where transmitting at these higher frequencies involves transmitting at shorter wavelengths. Such shorter wavelengths may be susceptible to greater path losses, which may adversely affect the link budget threshold (e.g., a link margin) of a communication link. This may lead to an increase in communication failures.

A UE may attempt to connect to a base station using a random access procedure. The UE may transmit a random access request to the base station (e.g., a message 1 or msg 1). For example, the UE may transmit a physical random access channel (PRACH) preamble to the base station indicating the resource requirement of the UE to initiate the random access procedure. The base station may acknowledge the random access request by transmitting a message 2 (or msg 2) to the UE. The message 2 may include control information and a random access response (RAR). The UE may expect to receive the message 2 during a time window (e.g., a RAR window). The base station may transmit the control information via a physical downlink control channel (PDCCH) to indicate a location (e.g., a frequency and a time) for where the UE may receive the RAR via a physical downlink shared channel (PDSCH). In some cases, the UE and the base station may be in a low connectivity condition based on a link budget threshold associated with the communication link between the UE and the base station. For example, the UE and the base station may communicate using higher frequency ranges (e.g., mmW frequency ranges such as FR2) such that transmissions over the communication link may experience greater path losses. Further, the base station may transmit the control information via PDCCH using a relatively wide beam width based on a number of synchronization signal blocks (SSBs) associated with the PDCCH transmission. Additionally, the UE and the base station may be in a low connectivity condition for a variety of other reasons, such as environmental factors (e.g., separation distance, signal obstruction, etc.). Such conditions may result in an increase in communication failures over the communication link. For example, the UE may be unable to successfully receive (e.g., decode) the control information transmitted by the base station and, likewise, may be unable to receive the RAR from the base station. In such examples, the random access procedure may fail and the UE and the base station may not establish a communication link.

In some examples of the present disclosure, the UE and the base station may support a reconfigured RAR window that may increase the likelihood of the UE successfully receiving the control information. For instance, the base station may configure a RAR window to increase the chance that the UE may successfully receive and decode the control information. The base station may configure the RAR window to support communication of repeating instances of the control information. For example, the base station may configure the RAR window to enable first segments of the RAR window to support communication of single instances of the control information and second segments of the RAR window to support communication of repeating instances of the control information. During the second segments of the RAR window, the UE may identify and combine (e.g., using soft combining) multiple instances of the control information to improve the likelihood that the UE may be able to successfully decode the control information and identify the location of the RAR. The RAR window may be contiguous or non-contiguous. In this regard, first segments (supporting single instances of control information) may be directly adjacent to (e.g., in a contiguous RAR window) or spaced from (e.g., in a non-contiguous RAR window) the second segments (supporting repeated instances of the control information). Further, the first segments (supporting single instances of control information) may occur before the second segments (supporting repeated instances of the control information) or vice versa.

Further, some RAR windows may be configured to support only communication of single instances of the control information and other RAR windows configured to support communication of repeating instances of the control portion. Whether a particular RAR window supports only single instances or repeating instances can be predefined (e.g., based on timing, pattern(s), etc.) or dynamically configured (e.g., based on communication link, network load, signal strength, etc.). In some instances, all RAR windows may be configured to support communication of repeating instances of the control portion, but a base station may dynamically determine whether to utilize repeating instances or not. For example, the base station may determine based on communication link, network load, signal strength, and/or other factors to repeatedly transmit the control information for a segment of a RAR window.

The base station may signal the RAR window configuration via system information, such as a system information block (SIB) or a master information block (MIB). Additionally, or alternatively, the base station may signal the RAR window configuration via a physical broadcast channel (PBCH). For example, a MIB with RAR window configuration information may be transmitted via PBCH. As another example, a SIB with RAR window configuration information may be transmitted in remaining minimum system information (RMSI) via PDSCH. The signaling may include information indicating the RAR window is configured into segments, where a first group of the segments support a single instance of control information transmission and a second group of the segments support repeated control information transmissions. Based on the signaling, the UE may identify the RAR window configuration (e.g., either as explicitly indicated by the system information or from a look up table (LUT) or other mapping). For example, a mapping between a value of one or more bits or fields of the system information can indicate parameters of the RAR window, including whether a RAR window supports a single instance or repeated instances of control information, the segments of the RAR window, the length(s) of the segments in time, the segments associated repetition number (e.g., 0 for segments supporting a single instance of control information or 1, 2, 3, . . . , n for segments supporting repetition of control information), etc. In some instances, the mapping is based on a fixed table. In some instances, multiple mappings (e.g., multiple LUTs) may be available to choose from and which mapping to use can be indicated in the system information (e.g., via the value(s) of a bit or field in a MIB or a SIB). Based on the RAR window configuration, the UE can identify one or more reception opportunities for the control information in the RAR window.

Based on the RAR window configuration, the UE may identify repetition parameters for a RAR window and/or segments of the RAR window. For example, for a RAR window supporting multiple repetitions of the control information and/or the RAR of message 2, the UE may identify a number of repetitions, a repetition level, an index, a location, and/or any other information regarding the transmission of the control information (including any repetitions) and/or the RAR (including any repetitions) in a segment of the RAR window. The repetition parameters may enable the UE to determine which transmissions are instances of the control information (and/or the RAR) such that the UE may know which transmissions to combine. In some examples, the UE may combine multiple received transmissions of the control information (and/or the RAR) according to the signaling and may decode the combined control information signal. In some cases, combining multiple received transmissions of the control information may increase the likelihood that the UE will successfully decode the control information, and likewise may increase the chance that the UE will successfully receive the associated RAR of message 2. Further, in some examples, the UE may combine multiple received transmissions of the RAR according to the signaling and may decode the combined RAR signal, thereby, increasing the likelihood the UE will transmit a message 3 (e.g., RRC connection request) to the base station and the random access procedure will advance.

Particular aspects of the subject matter described herein may be implemented to realize one or more advantages. The described techniques may support a more robust random access procedure based on increasing the likelihood that a device may successfully receive the control information associated with a RAR during a RAR window, including during low connectivity conditions. Furthermore, devices implementing the techniques of the present disclosure may achieve power savings by reducing the number of repeats of a random access procedure required before successfully connecting to a serving base station. The device may identify a RAR window configuration for receiving the control information, including where repeated transmissions of control information may be supported, and may employ a soft combining technique to increase the likelihood that the device decodes the control information and identifies a location to receive the RAR (e.g., the PDSCH). Further, a base station may dynamically configure one or more RAR windows to utilize repeated transmissions of control information (and/or RAR) to improve the likelihood of a successful random access procedure. As such, supported techniques may include improved network operations and efficiencies, among other benefits.

Aspects of the disclosure are initially described in the context of wireless communications systems. Aspects of the disclosure are described in the context of a process flow, window configurations, and a repetition schedule. Aspects of the disclosure are further illustrated by and described with reference to apparatus diagrams, system diagrams, and flowcharts that relate to message repetition for random access procedure.

FIG. 1 illustrates an example of a wireless communications system 100 that supports RAR window configurations, including message repetition for a random access procedure, in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel instances in one or more repetition levels arranged in a cascaded manner A repetition level for a control channel instance may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some examples of the present disclosure, a base station 105 may configure a RAR window (e.g., a time window) as part of a random access procedure during which a UE 115 may expect to receive a message 2 (e.g., a random access response). The base station 105 may communicate the RAR window configuration (including an indication of the RAR window configuration) to the UE 115 via system information or other signaling. Within a RAR window, the base station 105 may transmit control information associated with the RAR to the UE 115. In some cases, the control information may include the location (e.g., the time and frequency resources) of the RAR. The UE 115 may use the control information to determine how to receive the RAR from the base station 105. In some implementations, the RAR window configuration may indicate whether a RAR window supports a single transmission of control information or repeated transmissions of control information. Where a RAR window supports repeated transmissions, the RAR window configuration may indicate that different segments of the RAR window are configured for different types of control information transmissions. In some examples, the different types of control information transmissions may be associated with different transmission patterns (e.g. repetition levels). For example, the base station 105 may transmit control information associated with a RAR with different repetition levels based on which segment of the RAR window a random access procedure is operating within.

In some instances, for a RAR window that supports repeated transmissions, one or more segments of the RAR window support a single transmission of control information (and/or RAR) and one or more segments of the RAR window support repeated transmission of control information (and/or RAR). In this regard, the one or more segments supporting repeated transmission of control information (and/or RAR) may have different levels of repetition (e.g., number of repetitions, spacing of repetitions, etc.) in some instances. For example, a first segment (or group of segments) may have a number, i, of repetitions (e.g., 2, 3, 4, etc.) and a second segment (or group of segments) may have a different number, j, of repetitions (e.g., 2, 3, 4, etc.). As another example, a first segment (or group of segments) may have a repeated transmission every k slots (e.g., 1, 2, 3, 4, etc.) and a second segment (or group of segments) may have a repeated transmission every 1 slots (e.g., 1, 2, 3, 4, etc.), where 1 is different than k. As a further example, a first segment (or group of segments) may have a repeated transmission every m ms (e.g., 5 ms, 10 ms, 15 ms, 20 ms, etc.) and a second segment (or group of segments) may have a repeated transmission every n ms (e.g., 5 ms, 10 ms, 15 ms, 20 ms, etc.), where n is different than m.

A RAR window may be contiguous or non-contiguous. For example, two segments of the RAR window may be adjacent to one another without any gap in time. Additionally, or alternatively, there may be some time gap between two segments of the RAR window. As such, a RAR window with a number of segments may feature no time gaps between each of the number of segments, a time gap between each of the number of segments, or a combination of no time gaps between some segments and a time gap between some other segments. This time gap may be defined in the standard specifications or may be configured as part of the RAR window configuration.

In some implementations, the base station 105 may identify, in accordance with the RAR window configuration, that a random access procedure is operating within a RAR window that supports a single transmission of control information (or operating within one or more segments of the RAR window that support a single transmission of control information of a RAR window that also includes one or more other segments that support repeated transmissions of control information). Accordingly, the base station 105 may determine to transmit a single instance of the control information based on the random access procedure operating within the RAR window (or one or more segments of a RAR window) supporting a single transmission.

Likewise, the UE 115 may identify that the random access procedure is operating within a RAR window that supports a single transmission of control information (or operating within one or more segments of the RAR window that support a single transmission of control information of a RAR window that also includes one or more other segments that support repeated transmissions of control information). Accordingly, the UE 115 may provide a reception opportunity for the single instance of the control information based on the random access procedure operating within the RAR window (or one or more segments of a RAR window) supporting a single transmission. In some cases, however, the UE 115 and the base station 105 may be in a low connectivity condition (e.g., based on an insufficient link budget threshold) or other circumstances may be present such that the UE 115 may fail to successfully receive (e.g., decode) a single instance of the control information.

Additionally, or alternatively, the UE 115 and the base station 105 may identify that the random access procedure is operating within a RAR window that supports repeated transmissions of control information (or operating within one or more segments of the RAR window that support a repeated transmissions of control information of a RAR window that also includes one or more other segments that support a single transmission of control information). In some examples, the base station 105 may configure the RAR window such that particular segment(s) of the RAR window support repeatedly transmitting instances of the control information. Accordingly, the base station 105 may repeatedly transmit instances of the control information in those segments of the RAR window. In an example, the base station 105 may transmit a first instance of the control information in a first slot of the segment and may transmit a second instance of the control information in a second slot of the segment that follows the first slot in time (e.g., the first slot and the second slot may be two consecutive slots, or the second slot may be spaced from the first slot by one or more other slots).

Likewise, the UE 115 may identify that the random access procedure is operating within a RAR window that supports repeated transmissions of control information (or operating within one or more segments of the RAR window that support a repeated transmissions of control information of a RAR window that also includes one or more other segments that support a single transmission of control information). The UE 115 may monitor a number of slots within the segment of the RAR window for the repeating instances of the control information. In some examples, the UE 115 may, using RAR window configuration information received from the base station 105, identify a number of repetitions of the control information, a repetition level of the control information, an index of the control information, a location of the control information, or any other information that may enable the UE 115 to identify which instances (e.g., candidates) of the control information may belong to the same control information repetition pattern (e.g., the control information instances may include similar or identical copies of the control information). Based on the RAR window configuration information, including any repetition configuration information, the UE 115 may identify a number of instances of the control information and may combine (e.g., using soft combining) the control information instances that may be repeats of each other. In some examples, the UE 115 may decode the combination of control information instances to determine the location of the RAR.

Figure 2:
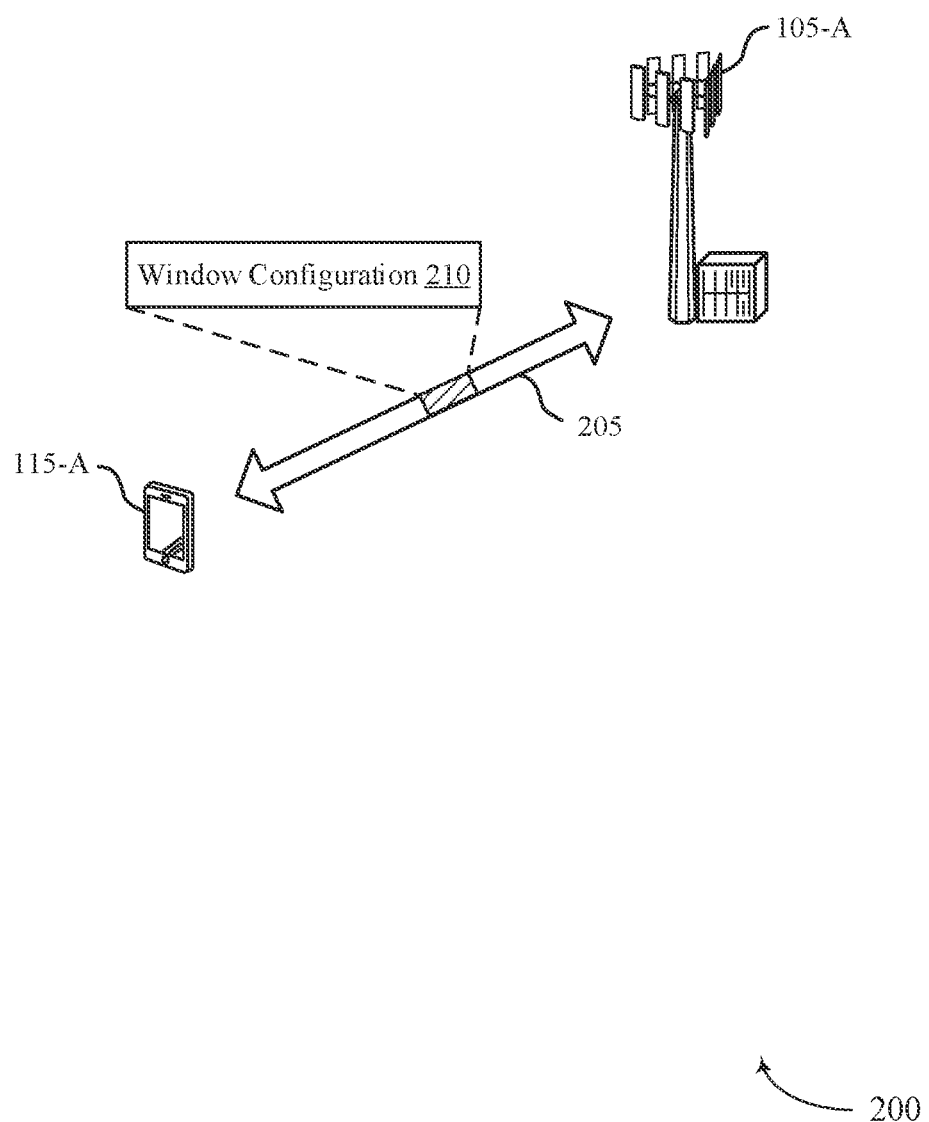
FIG. 2 illustrates an example of a wireless communication system that supports message repetition for a random access procedure in accordance with aspects of the present disclosure.

FIG. 2 illustrates an example wireless communications system 200 that supports message repetition for a random access procedure in at least some RAR windows in accordance with aspects of the present disclosure. In some examples, wireless communications system 200 may implement aspects of wireless communications system 100. In some cases, wireless communications system 200 may include a UE 115-*a* and a base station 105-*a*, which may be examples of UEs 115 and base stations 105 described with reference to FIG. 1. UE 115-*a* and base station 105-*a* may communicate over communication link 205. In some cases, the wireless communications system 200 (e.g., a 5G or an NR system that supports high frequency communications, such as FR2) may support enhancements for random access procedure at both ends of a communication link 205 (e.g., for both a UE 115 and a base station 105).

In some cases, the UE 115-*a* may not be connected to a serving base station (e.g., such as the base station 105-*a*), and may initiate a random access procedure to attempt to connect to the base station 105-*a*. The UE 115-*a* may receive system information (e.g., via a SIB, such as SIB1 or SIB2, and/or a MIB) from the base station 105-*a* via a broadcast message (e.g., via a PBCH) and/or via RMSI (e.g., via PDSCH). The UE 115-*a* may identify configuration information associated with the random access procedure based on the system information. For example, the base station 105 may broadcast information about a set of resources and/or a power level that may be used by a connecting UE (e.g., UE 115-*a*) during the random access procedure. Additionally, in accordance with the present disclosure, the base station 105 may transmit, via the system information, information regarding a RAR window configuration that the connecting UE 115-*a* may utilize to monitor for aspects of a random access response message (e.g., message 2, including control information and/or RAR).

The RAR window configuration may indicate which RAR windows support a single control information (and/or RAR) transmission and which RAR windows support repeated control information (and/or RAR) transmissions. Whether a particular RAR window supports single instances or repeating instances can be predefined (e.g., based on timing, pattern(s), etc.) or dynamically configured by the base station (e.g., based on communication link, network load, signal strength, interference, etc.). The RAR window configuration may further indicate, for RAR windows that support repeated transmissions, that different segments of the RAR window have different operating parameters. For example, a first segment (or group of segments) may support single instances of control information (and/or RAR) and a second segment (or group of the segments) may support repetition of control information (and/or RAR). Based on the RAR window configuration, the UE 115-*a* can identify one or more reception opportunities for the control information in the RAR window.

In some cases, the base station 105-*a* may indicate parameters of the RAR window configuration (e.g., RAR window length, RAR window type (e.g., single instance or repetitions), segment type (e.g., single instance or repetitions), number of repetitions, etc.) via one or more bits, fields, or indicators in the system information. In some instances, the UE 115-*a* utilizes a LUT or other mapping to map value(s) of the one or more bits, fields, or indicators in the system information to corresponding parameters of the RAR window configuration.

The UE 115-*a* may transmit a random access request to the base station 105-*a* to initiate the random access procedure, which may include a PRACH preamble and a radio network temporary identifier (RNTI), such as a random access RNTI (RA-RNTI). The UE 115-*a*, using the random access request, may indicate information to the base station 105-*a* about its resource requirements. The base station 105-*a* may receive the random access request from the UE 115-*a* and may respond by transmitting a message 2, including control information and a RAR. In some cases, the UE 115-*a* may expect to receive the RAR within the RAR window indicated by the system information broadcast by the base station 105-*a*. During the RAR window, the base station 105-*a* may transmit control information conveyed by a control channel (e.g., via the PDCCH) that may indicate to the UE 115-*a* the location (e.g., the time and frequency resources) of the RAR conveyed by a data channel (e.g., via the PDSCH).

In some cases, the base station 105-*a* may transmit a single instance of control information during a number of slots included in a RAR window or a segment of the RAR window. The UE 115-*a* may attempt to receive and decode each instance of the control information independently. For example, if the UE 115-*a* is unable to receive and decode a first instance of control information, the UE 115-*a* may discard the unsuccessfully received and/or decoded control information and may attempt to receive and decode a second instance of control information without storing any information associated with the first instance. This process may repeat for each monitoring occasion of the RAR window or the segment of the RAR window until the UE 115-*a* successfully receives and decodes a control information transmission or until the RAR window or segment ends.

Upon successful reception of the control information, the UE 115-*a* may decode the control information and perform a parity check (e.g., a cyclic redundancy check (CRC)) on the control information. Based on performing the parity check, the UE 115-*a* may determine that the control information is relevant to a random access response from the base station 105-*a*. In cases when the decoding and the parity check are successful and the random access response is decoded, the UE 115-*a* may transmit a message 3 (e.g., a radio resource control (RRC) connection request) to the base station 105-*a* and the random access procedure may advance (e.g., the random access procedure may advance to a next step).

In some cases, the communication link 205 between the UE 115-*a* and the base station 105-*a* may be associated with a link budget threshold (e.g., a link margin) based on the link characteristics of communication link 205. For example, a path loss, a received signal strength, and other characteristics may influence the link budget threshold of the communication link 205. As wireless communications systems, such as wireless communications system 200, aim to more efficiently and reliably increase throughput, additional frequency ranges may be used by communicating devices (e.g., UE 115-*a* and base station 105-*a*), which may enable devices to achieve higher throughput. Higher frequency ranges (e.g., such as frequency ranges used in FR2, including millimeter wave (mmW) frequency ranges) may be implemented for wireless communications, where transmitting at these higher frequencies involves transmitting at shorter wavelengths. In some wireless communications systems, the designations FR1 and FR2 may refer to frequency ranges that are available for communicating using the wireless communications system. For example, FR1 may refer to frequency range between about 450 MHz and about 7,125 MHz and FR2 may refer to a frequency range between about 24,250 MHz and about 52,600 MHz. Shorter wavelengths may be susceptible to greater path losses, which may adversely affect the link budget threshold (e.g., a link margin) of communication link 205. Further, the base station 105-*a* may employ a relatively wide transmit beam for transmissions to the UE 115-*a*. For example, the beamwidth of the transmit beam of the base station 105-*a* may be based on (e.g., proportional to) the number of synchronization signal blocks (SSBs) associated with the transmissions of the base station 105-*a*. Based on receiving signals via a beam with a relatively wide beamwidth, the UE 115-a may experience a lower received signal strength, which may also adversely affect the link budget threshold. In some cases, the link budget threshold may fall below a threshold value, which may result in an increase in communication failures over communication link 205.

In some examples, the base station 105-a may identify that the link budget is below a threshold value and, accordingly, determine that the base station 105-a is operating in a low connectivity condition with the UE 115-a. In such examples, the control information associated with the RAR from the base station 105-a may have a lower likelihood of successful reception by the UE 115-a (e.g., based on the low connectivity and poor link conditions). If the control information cannot be successfully decoded, the UE 115-a may be unable to determine the location of the RAR and, therefore, may be unable to transmit an RRC connection request, which may result in termination of the random access procedure without establishing a connection. The UE 115-a may have to restart the random access procedure by retransmitting a random access request.

In some examples of the present disclosure, the random access procedure between the UE 115-a and the base station 105-a may experience more successful random access procedure during low connectivity conditions by combining (e.g., using soft combining) repeated instances of control information transmissions. As described herein, a configurable RAR window may be defined to enable a UE 115-a to combine multiple instances of the control information associated with the RAR during one or more segments of the RAR window and to decode and perform a parity check of the combined instances of the control information.

In some implementations, the base station 105-a may configure a RAR window configuration to support combining multiple repetitions of the control information associated with the RAR in a RAR window and/or one or more segments of the RAR window. In some examples, the base station 105-a may configure some RAR windows to support single transmissions and other RAR windows (or segment(s) of a RAR window) to support repeated transmissions. In some instances, the base station 105-a may segment an initial (e.g., a default) RAR window length into two or more segments, where each segment may be associated with a particular type of control information transmission pattern (e.g., a different repetition level). Additionally, or alternatively, the base station 105-a may append one or more an additional RAR window length segments to the initial RAR window length and may configure the initial and/or additional segment(s) to support one or more control information transmission patterns. The segment(s) of the initial RAR window length may be time intervals within the initial RAR window length (e.g., an initial time window for the RAR). Similarly, the appended segments to an initial RAR window length may be additional time intervals appended to the initial time window for the RAR, effectively extending the time window for a RAR.

The base station 105-a may transmit the RAR window configuration via a window configuration 210 to the UE 115-a. In some examples, the base station 105-a may transmit the window configuration 210 as part of a system information broadcast transmission (e.g., may be transmitted with a SIB and/or a master information block (MIB) via a PBCH, a broadcast control channel (BCCH), or a broadcast channel (BCH), PDSCH, or a combination thereof) that may be received by a UE 115-a. Accordingly, the UE 115-a may attempt to connect to the base station 105-a using a random access procedure and may know to use the RAR window configuration indicated by the window configuration 210. The window configuration 210 may be an example of an indicator included in the system information. For example, a UE 115-a may receive the window configuration 210 and identify the RAR window configuration based on identifying the indicator included in the window configuration 210. In some implementations, the indicator may include an explicit configuration of the RAR window, while in others the indictor may correspond to an entry (e.g., an index) in a look up table (LUT) or other mapping that the UE 115-a may use to identify the RAR window configuration. For example, the window configuration 210 may include an index value and the UE 115-a may identify information about the RAR window configuration based on the index value (e.g., based on referencing the index value in a set of preconfigured RAR window configurations known to the UE 115-a). In some instances, multiple mappings (e.g., multiple LUTs) may be available to choose from and which mapping to use can be indicated in the system information (e.g., via value(s) of a bit or field in a MIB or a SIB) in addition to an associated index value to be utilized with the chosen mapping.

In some examples, the UE 115-a may monitor a number of slots for control information transmission(s) associated with the RAR based on the RAR window configuration received via the window configuration 210. For example, UE 115-a may identify a repetition level of the control information, a number of repetitions of the control information, spacing(s) between control information instances, an index of the control information, a location of the control information, or any other information that may enable the UE 115-a to identify which instances of control information transmission may be paired or grouped together (e.g., may be associated with the same RAR) based on the window configuration 210. Based on identifying this information from the window configuration 210, the UE 115-a may identify a number of control information instances that may be stored and combined with other control information instances. The UE 115-a may effectively increase the received signal strength of the control information transmissions by combining repetitions of the transmissions together, thereby increasing the likelihood of successful decoding.

Figure 3:
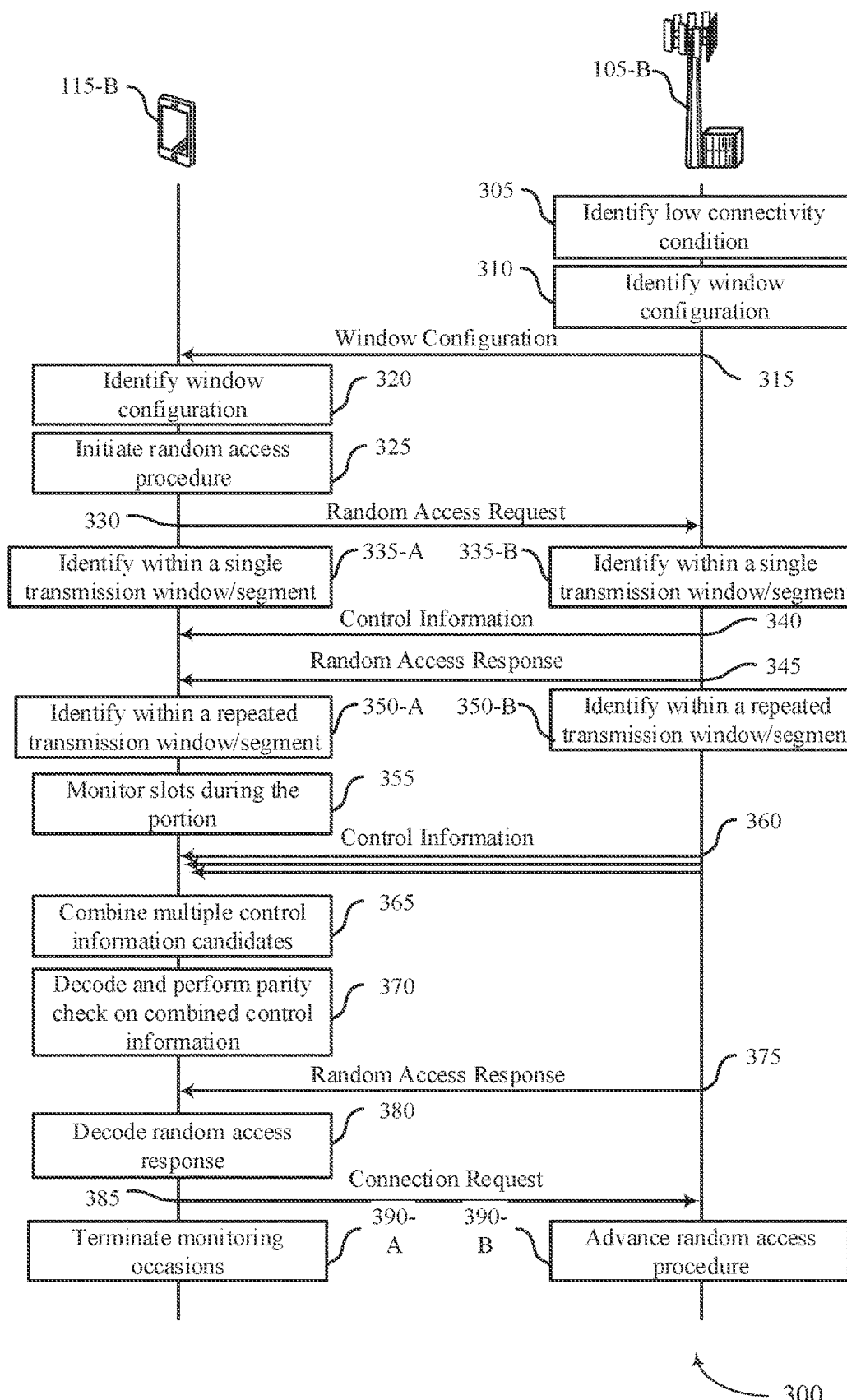
FIG. 3 illustrates an example of a process flow that supports message repetition for a random access procedure in accordance with aspects of the present disclosure.

FIG. 3 illustrates an example of a process flow 300 that supports message repetition for a random access procedure in accordance with aspects of the present disclosure. In some examples, the process flow 300 may implement aspects of wireless communications systems 100 and 200. The process flow 300 may include UE 115-b and base station 105-b, which may be examples of the corresponding devices described with reference to FIGS. 1 and 2. UE 115-b and base station 105-b may implement one or more techniques for implementing soft-combining of control information transmissions associated with a RAR during a random access procedure between the UE 115-b and the base station 105-b. Alternative examples of the following may be implemented, where some steps are performed in a different order than described or are not performed at all. In some cases, steps may include additional features not mentioned below, or further steps may be added.

At 305, the base station 105-b may identify that the base station 105-b is operating in a lower connectivity condition. For example, the base station 105-b may identify that a link budget threshold of a communication link between the UE 115-b and the base station 105-b (e.g., communication link 205 described with reference to FIG. 2) is less than a threshold value, which may be associated with an increase in communication failures between the UE 115-b and the base station 105-*b*. In some examples, the link budget may fall below the threshold value based on a frequency range (e.g., and resulting path losses) of the transmissions between the UE 115-*b* and the base station 105-*b* (e.g., the UE 115-*b* and the base station 105-*b* may employ relatively high frequency ranges, such as mmW frequency ranges used in FR2) and/or based on a beam width of the transmitting device (e.g., the base station 105-*b* may employ a relatively wide beam width, potentially resulting in a lower received signal strength at the UE 115-*b*).

Additionally, the base station 105-*b* may identify that the base station 105-*b* is operating in the low connectivity condition based on a number of previous communication failures resulting from a variety of additional factors that may influence the link budget threshold (e.g., link obstruction by an object, separation distance, and other environmental factors). In cases when the base station 105-*b* identifies that a low connectivity condition applies, the base station 105-*b* may determine or predict that a random access procedure between the UE 115-*b* and the base station 105-*b* may be unsuccessful. For example, based on identifying a low connectivity condition applies to current operations, the base station 105-*b* may determine or predict that single instances of control information transmissions during a RAR window may be received by the UE 115-*b* with an insufficient signal quality (e.g., a low SNR, a low received signal strength, etc.) such that the UE 115-*b* may be unable to successfully receive and decode individual instances of the control information. Accordingly, the base station 105-*b* may determine that the UE 115-*b* will be unlikely to identify the location of the RAR and, therefore, unlikely to advance the random access procedure. In some instances, step 305 is omitted.

At 310, the base station 105-*b* may identify a configuration of a RAR window for communicating the RAR as part of a random access procedure. In some instances, the base station 105-*b* identifies the RAR window configuration in accordance with predefined criteria (e.g., timing, pattern(s), etc.). In some instances, the base station 105-*b* identifies the RAR window configuration dynamically (e.g., based on communication link, network load, signal strength, interference, etc.). For example, the RAR window configuration may be identified based on determining that the base station 105-*b* is operating in a low connectivity condition. For example, the base station 105-*b* may identify a RAR window configuration such that the UE 115-*b* may experience a greater likelihood to successfully receive control information associated with the RAR, and accordingly may be more likely to receive the RAR and advance the random access procedure. In some cases, the UE 115-*b* may more successfully receive and decode transmissions (e.g., instances of control information) based on employing a combining technique (e.g., soft combining) that combines two or more transmissions together prior to decoding. In some instances, the base station 105-*b* identifies the RAR window configuration semi-statically such that a current RAR window configuration is maintained until a trigger event occurs, at which point the RAR window configuration is updated. The trigger event may be predefined (e.g., timer, counter, etc.) or dynamically determined (e.g., based on communication link, network load, signal strength, interference, etc.).

In some examples, the base station 105-*b* may identify a RAR window configuration that includes a RAR window (or one or more segments of the RAR window) for transmitting multiple instances of control information (and/or RAR) and for the UE 115-*b* to use combining techniques to decode the multiple instances of the control information. In some examples, a segment of the RAR window supporting multiple instances or repetitions of control information (and/or RAR) follows a segment that supports only a single instance of control information. In some examples, the RAR window may be partitioned such that the initial (e.g., default) RAR window length is separated into alternating segments that support a single instance or multiple instances of control information (and/or RAR) (e.g., a segment supporting a single instance followed by a segment support multiple instances followed by a segment supporting a single instance and so on). In some implementations, the base station 105-*b* may identify the RAR window configuration from a pre-configured set of RAR window configurations (e.g., based on a LUT and/or a number of mappings at the UE 115-*b*) or the base station 105-*b* may determine the RAR window configuration.

In some examples, the base station 105-*b* may identify a RAR window configuration that partitions an initial RAR window length into two or more different segments types. For example, the base station 105-*a* may configure a first segment (or group of segments) of the RAR window length to support transmitting single instances of the control information (and/or RAR). Additionally, the base station 105-*b* may configure a second segment (or group of segments) of the RAR window length to support transmitting repeating instances of the control information (and/or RAR) in a number of slots (e.g., a number of consecutive (or non-consecutive) slots according to a repetition level). Further, the base station 105-*b* may configure one or more additional segments (or groups of segments) of the RAR window length to support transmitting repeating instances of the control information (and/or RAR) but with one or more different repetition parameter(s) (e.g., repetition level, number of repetitions, repetition spacing(s)) relative to other segments or groups of segments.

Additionally, or alternatively, the base station 105-*b* may identify a RAR window configuration that appends one or more additional segments to the initial RAR window length. In a similar way to the above example of partitioning, the base station 105-*b* may configure the one or more segments of the initial RAR window length and/or the appended segments to support transmitting single instances of the control information or multiple instances of control information. In some examples, the initial RAR window and any appended segments may be partitioned into alternating segments that support a single instance or multiple instances of control information (e.g., a segment supporting a single instance followed by a segment support multiple instances followed by a segment supporting a single instance and so on) for the cumulative length of the RAR window. The base station 105-*b* may configure the RAR window with any number of segments and/or appended segments within the scope of the present disclosure.

Once the base station 105-*b* identifies and/or selects the RAR window configuration, the base station 105-*b* may transmit a window configuration at 315 to inform the UE 115-*b* of the RAR window configuration so that both the UE 115-*b* and the base station 105-*b* may operate coherently (e.g., so that the UE 115-*b* knows when and how it may combine instances of control information transmissions).

The base station 105-*b* may transmit the window configuration at 315, which may convey the RAR window configuration that may be used during a random access procedure. In some examples, the base station 105-*b* may transmit the window configuration via system information. For example, the base station 105-*b* may signal the window configuration by one or more bits in a system information bitfield. In some cases, the base station 105-*b* may signal the window configuration by one or more additional bits in a length bitfield that may define the RAR window length. Additionally, or alternatively, the base station 105-*b* may signal the RAR window configuration via PBCH and/or PDSCH. For example, a MIB with RAR window configuration information may be transmitted via PBCH. As another example, a SIB with RAR window configuration information may be transmitted in remaining minimum system information (RMSI) via PDSCH. The signaling may include information indicating a configuration of the RAR window into segments, where a first segment (or group of segments) support a single instance of control information and a second segment (or group of the segments) support repetition of control information. Likewise, the base station 105-*b* may also indicate to the UE 115-*b*, via the window configuration at 315, the number of control information repetitions in each segment of the RAR window supporting repeated transmissions by the system information.

In some implementations, the base station 105-*b* may explicitly signal the RAR window configuration in the window configuration at 315. In other implementations, the base station 105-*b* may transmit an indication of the RAR window configuration that the UE 115-*b* may use to identify the RAR window configuration (e.g., from a LUT). For example, the base station 105-*b* may transmit, via the window configuration at 315, an indicator or an index value that the UE 115-*b* may use as an input into LUT (e.g., a fixed table) and/or as an input into one of multiple mapping operations. Accordingly, the UE 115-*b* may receive the window configuration (e.g., the system information including the window configuration) that includes an indicator or an index value. In some cases, the indicator may include the index value. Further, in some instances, the base station 105-*b* may transmit, via the window configuration at 315, an indicator or an index value of a LUT that the UE 115-*b* may use to determine which LUT of a plurality of available LUTs or mapping operations should be utilized for identifying the RAR window configuration to be used. The LUT indicator or index value may be included as part of the window configuration 315 or as part of a separate communication.

At 320, the UE 115-*b* may identify the RAR window configuration for communicating (e.g., receiving) the control information (and/or RAR) as part of a random access procedure based on receiving the system information including the indicator or the index value. In some examples, the UE 115-*b* may use the indicator or the index value as an input into a LUT and/or a mapping function and, using the LUT and/or the mapping function, may retrieve information about the RAR window configuration. Additionally, or alternatively, the UE 115-*b* may use an indicator to otherwise identify the configuration of the RAR window. For example, the indictor may indicate one or more window lengths. For instance, the indictor may indicate a RAR window length, RAR window type (e.g., single instance or repetitions), segment type (e.g., single instance or repetitions), number of repetitions, an initial (e.g., default) RAR window length, a number of appended window lengths (e.g., appended window segments), a number of segment lengths that partition a larger window length, a number of segment lengths for one or more segment types (e.g., supporting single transmission or supporting repeated transmissions), and/or a combination thereof.

Based on receiving the window configuration at 315 via system information from the base station 105-*b*, the UE 115-*a* may identify the total RAR window length, the RAR window type, the number of segments in the RAR window, the type(s) of segments in the RAR window, the segment length(s) in the RAR window, and/or other parameters of the RAR window based on the RAR window configuration indicated in the system information. Additionally, the UE 115-*a* may identify information about a repetition level associated with one or more segments of the RAR window. For example, the UE 115-*a* may identify that a first segment (or group of segments) of the RAR window may be associated with a single instance of control information and may not support repetitions. In some examples, the UE 115-*a* may identify that a second segment (or group of segments) of the RAR window is associated with a repetition level, where the repetition level may include a numerical quantity of slots for repeating the transmission of the control information. In some cases, the repetition level may include a numerical quantity of consecutive slots for repeating the transmission of the control information. In some implementations, the UE 115-*a* may identify a number of slots that may include control information repetitions and a location in each of the number of slots where the control information repetitions may be received. In some cases, the number of slots may be consecutive.

At 325, the UE 115-*b* may initiate the random access procedure and, at 330, the UE 115-*b* may transmit a random access request to the base station 105-*b*. For example, the UE 115-*b* may be an unserved UE 115-*b* or may be switching from another base station 105-*b* and may attempt to connect to the base station 105-*b* using a random access procedure. The UE 115-*b* may use a contention-based random access procedure or a contention-free random access procedure. In some cases, the UE 115-*b* may transmit the random access request to the base station 105-*b* as part of a random access preamble. The random access request may include a preamble identification (ID) and an RA-RNTI. In some examples, the UE 115-*b* may use the random access request to initiate the random access procedure and to provide an indication to the base station 105-*b* about the resource requirement of the UE 115-*b*. Upon transmission of the random access request, the UE 115-*b* may expect to receive a RAR during an upcoming RAR window (e.g., according to the RAR window configuration identified at 325).

At 335-*a*, during a RAR window for communicating a RAR, the UE 115-*b* may identify that the random access procedure is operating within a RAR window (or segment of the RAR window) supporting a single instance or transmission of the control information associated with the RAR. Similarly, at 335-*b*, the base station 105-*b* may identify that the random access procedure is operating within the RAR window (or segment of the RAR window) supporting a single instance or transmission of the control information associated with the RAR. At 340, based on identifying that the random access procedure is operating within the RAR window (or segment of the RAR window) supporting a single instance or transmission of the control information associated with the RAR, the base station 105-*b* may transmit a single instance of the control information associated with a RAR. In some cases, the control information may include a location (e.g., time and frequency resources) for receiving the RAR.

The UE 115-*b* may attempt to receive and decode the single instance of the control information and may perform a parity check (e.g., a CRC parity check) on the control information. In some cases, the UE 115-*b* may successfully receive and decode the control information (e.g., the link budget may be above the threshold value) and identify the location for receiving the RAR. At 345, the base station 105-*b* may transmit the RAR and the UE 115-*b* may receive the RAR based on successfully receiving and decoding the control information at 340. In such cases, the UE 115-*b* may skip to block 380, decode the random access response, and may transmit a connection request 385 to the base station 105-*b*. Based in part on transmitting the connection request, the UE 115-*b* may terminate monitoring slots in the RAR window at 390-*a* and the base station 105-*b* may advance the random access procedure at 390-*b*. In this manner, a UE 115-*b* that is operating in a high connectivity condition (e.g., featuring a communication link with a link budget that is greater than the threshold value) may refrain from monitoring more slots than may be necessary for the UE 115-*b* to establish a connection with the base station 105-*b*.

However, in some examples (e.g., when the link budget threshold is below the threshold value), the UE 115-*b* may be unable to successfully decode the single instance of control information at 340. In such examples and other instances, the base station 105-*b* may transmit a number of instances of control information associated with a RAR throughout a number of slots associated with the RAR window (or segment of the RAR window) supporting single transmission. The UE 115-*b* may attempt to receive and decode each instance of the control information independently. For example, the UE 115-*b* may unsuccessfully attempt to receive and decode a first instance of the control information in a first slot and may discard the information related to the first instance of the control information based on unsuccessfully receiving and decoding the control information. In some cases, the UE 115-*b* may repeat the process of discarding instances of control information that were not received and decoded successfully until the RAR window (or segment of the RAR window) expires. For example, the base station may identify that a timer associated with the RAR window (or segment of the RAR window) has expired and identify that the base station 105-*b* has not received a connection request (e.g., a connection request that the UE 115-*b* may transmit at 385 upon successfully receiving the RAR) indicating that the UE 115-*b* successfully received the RAR. Accordingly, the base station 105-*b* may determine that the UE 115-*b* was unable to receive any of the single instances of the control information during the RAR window (or segment of the RAR window).

Additionally, or alternatively, at 350-*a*, during a RAR window for communicating a RAR, the UE 115-*b* may identify that the random access procedure is operating within a RAR window (or segment of the RAR window) supporting repeated instances or transmissions of the control information associated with the RAR. Similarly, at 350-*b*, the base station 105-*b* may identify that the random access procedure is operating within the RAR window (or segment of the RAR window) supporting repeated instances or transmissions of the control information associated with the RAR. As such, the UE 115-*b* and the base station 105-*b* may identify that the random access procedure is operating within a RAR window (or segment of the RAR window) configured for repeatedly transmitting control information associated with the RAR. In some instances, steps 350-A and 350-B precede 335-A and 335-B. That is, in some instances the UE 115-*b* and base station 105-*b* may determine, in response to the UE 115-*b* initiating the random access procedure at 325, that the random access procedure is operating within a RAR window (or segment of the RAR window) supporting repeated instances or transmissions of the control information associated with the RAR.

At 355, the UE 115-*b* may monitor, during the RAR window (or segment of the RAR window), a number of slots for instances (e.g., candidates) of the control information based on identifying that the random access procedure is operating within the portion of the RAR window configured for repeatedly transmitting the control information. In some examples, the number of slots may be consecutive to each other, such that the base station 105-*b* may transmit a control information instance in each slot for a number of consecutive slots. In some cases, the number (e.g., the numerical quantity, such as 2, 3, 4, 5, 6, 7, 8, etc.) of slots may be based on a repetition level associated with the second portion of the RAR window. Additionally, or alternatively, the UE 115-*b* may monitor a location in non-consecutive slots for the control information instances based on the RAR window configuration. Additional information about transmission repetition schedules is described with reference to FIG. 5.

At 360, the base station 105-*b* may transmit repeating instances of the control information associated with the RAR in a number of slots of the RAR window (or segment of the RAR window). For example, the base station 105-*b* may repeatedly transmit identical copies of the control information associated with the RAR. The number of slots may be consecutive in some cases. In some examples, according to the RAR window configuration, the base station 105-*b* may transmit each repeating instance of the control information in the same location of each of the number of consecutive slots (e.g., at the beginning of each slot). Additionally, or alternatively, the base station 105-*b* may link the repeating instances of the control information via a repetition level. For example, the base station 105-*b* may transmit each instance of the repeating instances of the control information in a same location within a slot and/or each instance may feature the same repetition level, such that each instance of the control information may have the same number of control channel elements (CCEs) included in the control information. Additionally, or alternatively, each instance of the repeating instances of the control information may be associated with an index that links the repeating instances together. In some examples, the repeating instances of the control information may all feature the same index. In additional examples, however, the indexes of the repeating instances of the control information may follow a pattern included in the RAR window configuration.

Also at 360, the UE 115-*b* may attempt to receive (and decode) the repeatedly transmitted instances of the control information from the base station 105-*b*. In some cases, the base station 105-*b* may transmit repeating instances of the control information and the UE 115-*b* may monitor for repeating control information instances (e.g., instances of the control information that are linked according to the RAR window configuration). In some examples, the UE 115-*b* may identify a number of control information instances while monitoring the number of slots and store the number of control information instances while monitoring for additional instances. The instances of the control information received by the UE 115-*b* and used for the combining may be similar or identical copies of the control information transmitted by the base station 105-*b*. The copies of the control information instances received by the UE 115-*b* may have slight differences due to disturbances that occur during communication of the signals that carry the copies of the instances of the control information.

At 365, the UE 115-*b* may combine (e.g., using soft-combining) the number of control information instances identified from monitoring the number of slots of the RAR window (or segment of the RAR window). As described herein, the UE 115-*b* may identify that a number of control information instances may be combined based on the information included in the RAR window configuration (e.g., based on RAR window type, based on segment type, based on a number of repetitions, a location in each slot, a repetition level, an index, and/or a combination thereof associated with each of the control information instances). Based on combining the number of control information instances, the UE 115-*a* may effectively increase the received signal strength or received signal-to-noise ratio (SNR) of the control information transmissions from the base station 105-*b*. For example, the UE 115-*a* may receive a number of partial, incomplete, or partially erroneous control information instances and, after combining, may construct a complete or near-complete control information signal.

At 370, the UE 115-*b* may attempt to decode the combined control information instances. In some examples, the UE 115-*b* may successfully decode the combined control information instances based on constructing a complete or near-complete control information signal from a number of the control information instances transmitted by the base station 105-*b*. Additionally, the UE 115-*b* may perform a parity check on the control information generated from combining the control information instances. In some cases, decoding the control information occurs after performing the parity check. The UE 115-*b* may detect any errors in the control information generated by combining the number of instances, and based on successfully performing the parity check the UE 115-*b* may identify the location (e.g., time and frequency resources) for a RAR corresponding to the random access request transmitted by the UE 115-*b* at 330.

At 375, the base station 105-*b* may transmit the RAR, and the UE 115-*b* may successfully receive and decode the RAR, at 380, based on the resource allocation indicated by the control information. In some cases, the UE 115-*b* may decode the RAR and identify an uplink resource allocation (e.g., an uplink grant) for transmitting a message 3 (e.g., an RRC connection request) that the UE 115-*b* may transmit using the physical uplink shared channel (PUSCH). At 385, the UE 115-*b* may transmit the connection request (e.g., the RRC connection request). Accordingly, the base station 105-*b* may receive the connection request and may advance the random access procedure, at 390-*b*, based on receiving the connection request. Correspondingly, the UE 115-*b*, at 390-*a*, may terminate monitoring slots in the RAR window (or segment of the RAR window) based on receiving the RAR and transmitting the connection request (e.g., advancing the random access procedure).

FIGS. 4A, 4B, 4C, and 4D illustrate examples of window configurations that support message repetition for a random access procedure in accordance with aspects of the present disclosure. In some examples, RAR window configurations 405-*a*, 405-*b*, 405-*c*, and 405-d support segmenting one or more RAR windows to include at least one segment that supports repeated transmissions of control information (and/or RAR) in order to enable a UE 115 to employ soft-combining techniques to increase the likelihood that the UE 115 may successfully receive the control information (e.g., PDCCH transmissions) and/or RAR (e.g., PDSCH transmissions) during a random access procedure and, therefore, increase the likelihood the UE 115 will successfully connect to the base station.

In some examples, the base station 105 may broadcast (e.g., via PBCH, BCCH, BCH, etc.) system information (e.g., SIB and/or MIB) to a number of UEs 115. The system information may indicate a variety of information including a RAR window configuration. Based on receiving the system information, the number of UEs 115 may identify the RAR window configuration 405. In some examples, each UE 115 of the number of UEs 115 may perform a random access procedure to connect to the base station 105 according to the indicated RAR window configuration 405.

In the examples of FIGS. 4A, 4B, 4C, and 4D each window configuration 405 may feature a first segment type 415, a second segment type 420, and/or a third segment type 425. In some examples, each segment type 415, 420, 425 may support a different type of control information (and/or RAR) transmission. For example, the first segment type 415 may support single instances of control information (and/or RAR) transmissions. In some cases, the first segment type 415 may relate to aspects of FIG. 3 where single instances of the control information associated with a RAR are transmitted (e.g., steps 335-A, 335-B, 340, 345).

The second segment type 420 may support repeated instances of control information (and/or RAR) transmissions. For example, the second segment type 420 may be associated with a first number of slots of the RAR window, and the base station 105 may transmit identical copies (sometimes referred to as instances) of the control information in each of a second number of slots (e.g., consecutive slots) according to a repetition level associated with the second segment type 420, where the second number of slots may be equal to or less than the first number of slots. In some cases, the second segment type 420 may relate to aspects of FIG. 3 where repeated instances of the control information associated with a RAR are transmitted (e.g., steps 350-A, 350-B, 355, 360).

Additionally, the third segment type 425 may support repeated instances of control information (and/or RAR) transmissions. For example, the third segment type 425 may be associated with a third number of slots of the RAR window, and the base station 105 may transmit identical copies (sometimes referred to as instances) of the control information in each of a fourth number of slots (e.g., consecutive slots) according to a repetition level associated with the third segment type 425, where the fourth number of slots may be equal to or less than the third number of slots. The repetition level of the third segment type 425 may different (e.g., a greater or fewer number of repetitions, larger or smaller repetition spacing/density, etc.) than the repetition level of the second segment type 420. In some cases, the third segment type 425 may relate to aspects of FIG. 3 where repeated instances of the control information associated with a RAR are transmitted (e.g., steps 350-A, 350-B, 355, 360).

While the examples of FIGS. 4A, 4B, 4C, and 4D may include one or more of the three identified segment types 415, 420, 425, it is understood that any number of segment types may be defined and used without departing from the scope of the present disclosure. For example, a window configuration may include one segment type, two segment types, three segment types, four segment types, five segment types, six segment types, seven segment types, eight segment types, etc. In some instances, each of the segment types may define a different repetition level for the control information associated with the random access response of a random access procedure.

Further, while the RAR window examples of FIGS. 4A, 4B, 4C, and 4D include one, two, three, or four segments, it is understood that a RAR window may be segmented into any number of segments (of one or more segment types) without departing from the scope of the present disclosure. For example, a RAR window in accordance with a RAR window configuration of the present disclosure may include one segment, two segments, three segments, four segments, five segments, six segments, seven segments, eight segments, etc. In some instances, each segment is associated with a repetition level (e.g., 0, 1, 2, 3, etc.) indicative of the number of transmission repetitions of the control information (and/or RAR) for that segment.

In some instances, the base station 105 may transmit control information at a progressively greater repetition level. As such, a first set of UEs 115 of the number of UEs 115 may be associated with good link conditions (e.g., may be in a higher connectivity state) and may successfully receive and decode a single instance of a control information transmission. Accordingly, the first set of UEs 115 may successfully connect to the base station 105 during the first segment type 415 of a RAR window that includes a single transmission of the control information. In some examples, a second set of UEs 115 may be associated with relatively worse link conditions (e.g., may be in a lower connectivity state) and may have been unable to successfully receive and decode the single instance of the control information transmission during the first segment type 415.

In such examples, the first set of UEs 115 may terminate their monitoring occasions and the base station 105 may advance the random access procedure for the first set of UEs 115. On the other hand, the second set of UEs 115 may identify that their random access procedure is operating within the second segment type 420 (e.g., the second set of UEs 115 may still be attempting to receive and decode the control information). During the second segment type 420, the second set of UEs 115 may combine multiple control information instances according to the window configuration 405 and the repetition level of the second segment type 420 (e.g., which may increase the likelihood of successfully receiving and decoding the control information during the RAR window). In some cases, a third set of UEs 115 (e.g., a subset of the second set that may be in a lower connectivity state) may still be unable to receive and decode the control information during the second segment type 420. Accordingly, the third set of UEs 115 may identify that their random access procedure is operating within the third segment type 425 that, in some instances, may be associated with a greater repetition level than the second segment type 420, further increasing the likelihood of successfully receiving and decoding the control information.

This process may continue with the UEs monitoring for the instances of the control information during each segment type based on the repetition level associated with the segment type. In this regard, in some instances a RAR window may alternate between a segment that provides for a single transmission of the control information (and/or RAR) (e.g., the first segment type 415) and a segment type that provides for repeated transmissions of the control information (and/or RAR) (e.g., the second or third segment types 420 and/or 425). Such an alternating approach may facilitate the successful connection of UEs at a lower connectivity state earlier in the RAR window as compared to approaches that increase the repetition level of the segments later into or at the end of the RAR window. However, in some instances of the present disclosure the segments of a RAR window increase in repetition level later into or at the end of the RAR window.

Figure 4A:
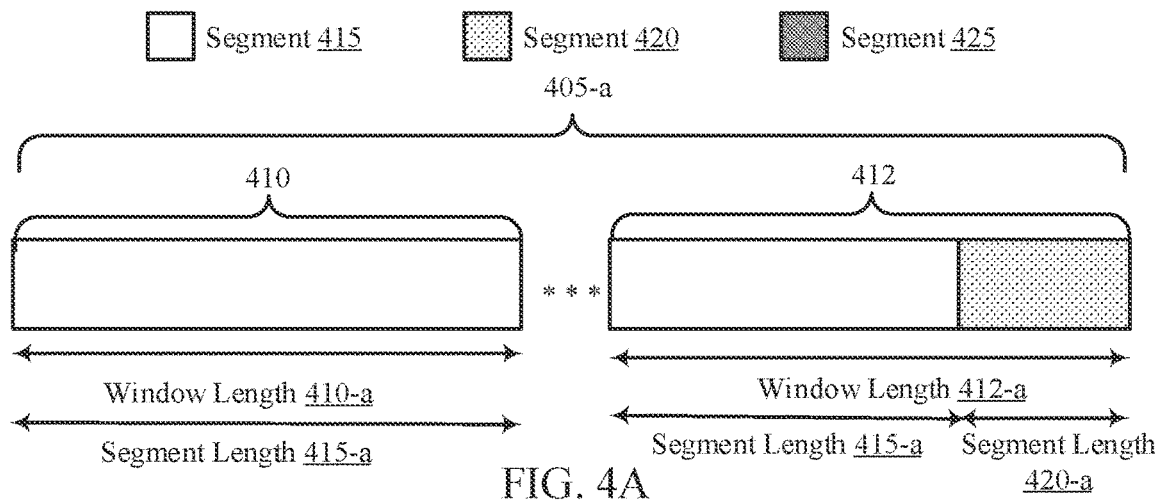
FIGS. 4A, 4B, 4C, and 4D illustrate examples of window configurations that support message repetition for a random access procedure in accordance with aspects of the present disclosure.

Window configuration 405-a of FIG. 4A may be an example of a RAR window configuration that supports the techniques of the present disclosure. Window configuration 405-a may be associated with a RAR window pattern. For example, in the illustrated example the window configuration 405-a includes a RAR window 410. The RAR window 410 has a window length 410-a. In some cases, window length 410-a may be associated with an initial (e.g., a default) window length of a RAR window that was indicated by the system information from the base station 105. For RAR window 410, the segment length 415-a of the segment 415 is equal to the window length 410-a. That is, the RAR window 410 includes one segment (segment 415) that supports a single instance of control information transmission for an associated RAR.

In the illustrated example of FIG. 4A, the window configuration 405-a also includes a RAR window 412. The RAR window 412 has a window length 412-a. In some cases, window length 412-a may be associated with an initial (e.g., a default) window length of a RAR window that was indicated by the system information from the base station 105. In some instances, window length 412-a is equal to window length 410-a. In other instances, the window length 412-a is longer (or shorter) than window length 410-a. RAR window 412 includes a first segment 415 and a second segment 420. The first segment 415 has a segment length 415-a, while the second segment 420 has a segment length 420-a. The segment lengths 415-a and 420-a collectively equal the window length 412-a. That is, the RAR window 412 includes two segments (segments 415 and 420), where one segment (segment 415) supports a single instance of control information transmission for an associated RAR and the other segment (segment 420) supports repeated transmissions of the control information for an associated RAR. Accordingly, RAR window 412 illustrates partitioning a RAR window into two or more segments, where at least one segment may be configured for repeatedly transmitting the control information (and/or RAR) as indicated by the system information.

In some instances, the RAR window 412 may be spaced in time from the RAR window 410. For example, the RAR window 412 may be spaced from the RAR window in accordance with a RAR window pattern, which may be based on time (e.g., 10 ms, 20 ms, 40 ms, 50 ms, 80 ms, or any other suitable time or timer based spacing), RAR window type pattern (e.g., every other, third, fourth, fifth, etc. RAR window can be configured to support repeated transmissions (or single transmission) of control information), and/or a combination thereof. In some instances, the RAR window configuration may indicate a series of RAR windows that each support a single instance of control information transmission (e.g., RAR window 410) interspersed with a RAR window that supports repeated instances of control information transmission (e.g., RAR window 412). In this regard, each RAR window may occur at a fixed time interval (e.g., 10 ms, 20 ms, 40 ms, 50 ms, 80 ms, or any other suitable time) and the interspersed RAR window supporting repeated instances of control information transmission (and/or RAR transmission) may occur after a particular number of RAR windows (e.g., one, two, three, four, etc.) and/or after a particular amount of time or time interval (e.g., 20 ms, 40 ms, 50 ms, 80 ms, or any other suitable time). In this manner, a RAR window pattern may dictate which RAR windows support a single transmission of control information (and/or RAR) (e.g., RAR window 410) and which RAR windows support repeated transmission of control information (and/or RAR) (e.g., RAR window 412).

In some instances, the base station 105 may dynamically configure one or more RAR windows to support repeated transmissions of the control information. In some examples, the BS 105 may also dynamically configure the level(s) of repetition for the associated segments of the RAR windows. In some examples, the base station 105 may dynamically configure one or more RAR windows based on communication link, network load, signal strength, interference, or other factors. The base station 105 may communicate system information to indicate the dynamically configured RAR window configuration.

Figure 4B:
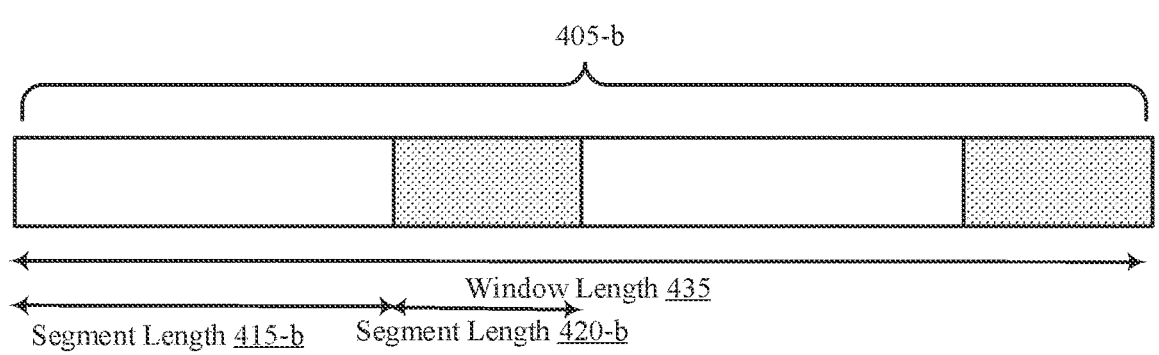

Window configuration 405-b of FIG. 4B may be another example of a RAR window configuration that supports the techniques of the present disclosure. As shown, window configuration 405-b may be associated with alternating segment types. For example, the window configuration 405-b includes a repeating pattern of a segment that provides for a single transmission of the control information (and/or RAR) (e.g., the first segment 415) and a segment that provides for repeated transmissions of the control information (and/or RAR) (e.g., the second segment 420). While the illustrated example includes two alternating sequences within the RAR window, it is understood that any number of sets of the alternating sequence may be utilized. Further, while the illustrated example alternates between two segment types, it is understood that any repeating pattern, weighted pattern, and/or random pattern of two, three, four, five, six, seven, eight, etc. different segment types may be utilized.

In the illustrated example of FIG. 4B, a RAR window of the window configuration 405-b has a window length 435. In some cases, the window length 435 may be associated with an initial (e.g., a default) window length of a RAR window that was indicated by the system information from the base station 105. Each occurrence of a first segment 415 of the RAR window has a segment length 415-a, while each occurrence of a second segment 420 has a segment length 420-a. The repeating pattern of the segments 415 and 420 collectively equal the window length 435. That is, the illustrated RAR window includes four segments (two instances of each of segments 415 and 420), where two segments (each instance of segment 415) support a single instance of control information transmission for an associated RAR and two segments (each instance of segment 420) support repeated transmissions of the control information for an associated RAR. Accordingly, the RAR window of the window configuration 405-b illustrates another example of partitioning a RAR window into two or more segments, where at least one segment may be configured for repeatedly transmitting the control information (and/or RAR) as indicated by the system information.

Figure 4C:
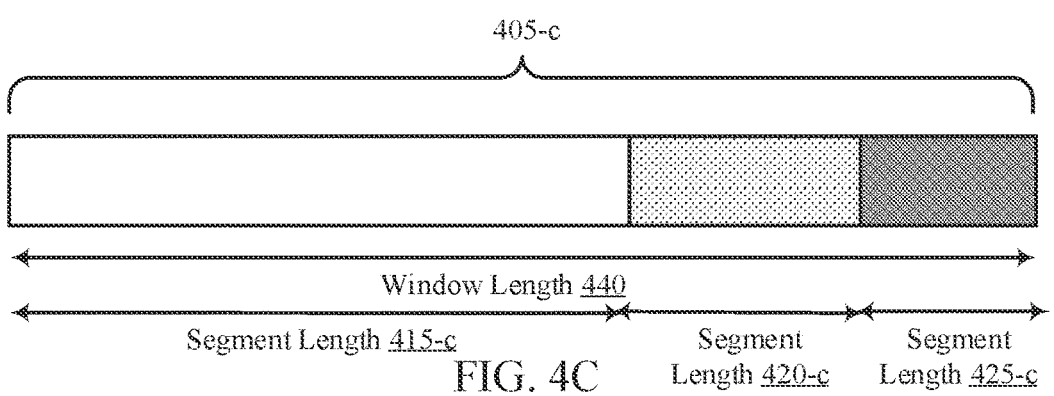

Window configuration 405-c of FIG. 4C may be another example of a RAR window configuration that supports the techniques of the present disclosure. Window configuration 405-c includes a RAR window having a window length 440. In some cases, window length 440 may be associated with an initial (e.g., a default) window length of a RAR window that was indicated by the system information from the base station 105. The RAR window includes a first segment 415 with a segment length 415c, a second segment 420 with a segment length 420-c, and third segment 425 with a segment length 425-c. The segments 415, 420, and 425 are contiguous. The segment lengths 415-c, 420-c, and 425-c collectively equal the window length 440. That is, the RAR window 412 includes three segments (segments 415, 420, and 425), where the first segment 415 supports a single instance of control information transmission for an associated RAR, the second segment 420 supports repeated transmissions of the control information for an associated RAR at a first repetition level, and the third segment 425 supports repeated transmissions of the control information for an associated RAR at a second repetition level different than first repetition level. In some instances, the second repetition level of the third segment 425 is greater than the first repetition level of the second segment 420. In other instances, the second repetition level of the third segment 425 is lower than the first repetition level of the second segment 420. Accordingly, the window configuration 405-c illustrates partitioning a RAR window into three or more segments, where at least two segments may be configured for repeatedly transmitting the control information (and/or RAR) as indicated by the system information.

Figure 4D:
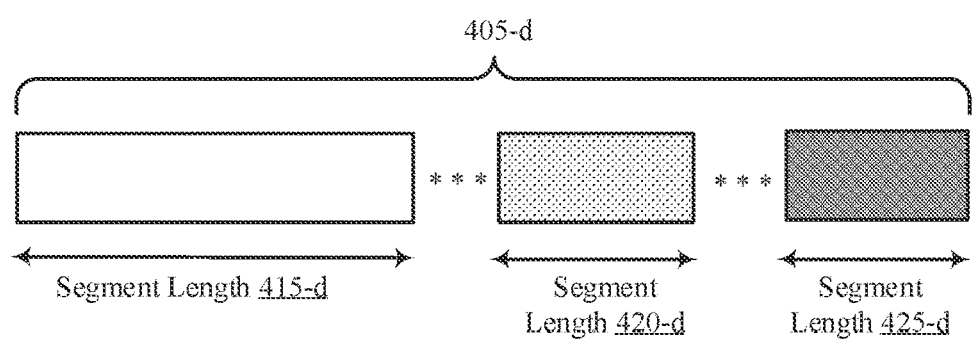

Window configuration 405-d of FIG. 4D may be another example of a RAR window configuration that supports the techniques of the present disclosure. Window configuration 405-d is similar to window configuration 405-c in some respects, but the segments 415, 420, and 425 are not contiguous in window configuration 405-d. That is, there is a space or a gap between the segments 415, 420, and 425 in window configuration 405-d. In some instances, the segments 415, 420, and 425 collectively define a single RAR window. In some instances, each of the segments 415, 420, and 425 itself defines a separate RAR window. As shown, the window configuration 405-d includes three segments (segments 415, 420, and 425), where the first segment 415 supports a single instance of control information transmission for an associated RAR, the second segment 420 supports repeated transmissions of the control information for an associated RAR at a first repetition level, and the third segment 425 supports repeated transmissions of the control information for an associated RAR at a second repetition level different than first repetition level. In some instances, the second repetition level of the third segment 425 is greater than the first repetition level of the second segment 420. In other instances, the second repetition level of the third segment 425 is lower than the first repetition level of the second segment 420. Accordingly, the window configuration 405-d illustrates partitioning a RAR window into three or more discontinuous segments (or separate RAR windows defined by each of the segments), where at least two segments may be configured for repeatedly transmitting the control information as indicated by the system information.

It is understood that the various features of the RAR window configurations illustrated in FIGS. 4A, 4B, 4C, and 4D may be utilized in combination with one another. For example, a RAR window type pattern and/or dynamic configuration of RAR window types consistent with FIG. 4A may be used in combination with the segment type patterns of FIGS. 4B, 4C, and 4D, including with contiguous segments (e.g., FIGS. 4B and 4C) and/or discontinuous segments (e.g., FIG. 4D).

Figure 5:
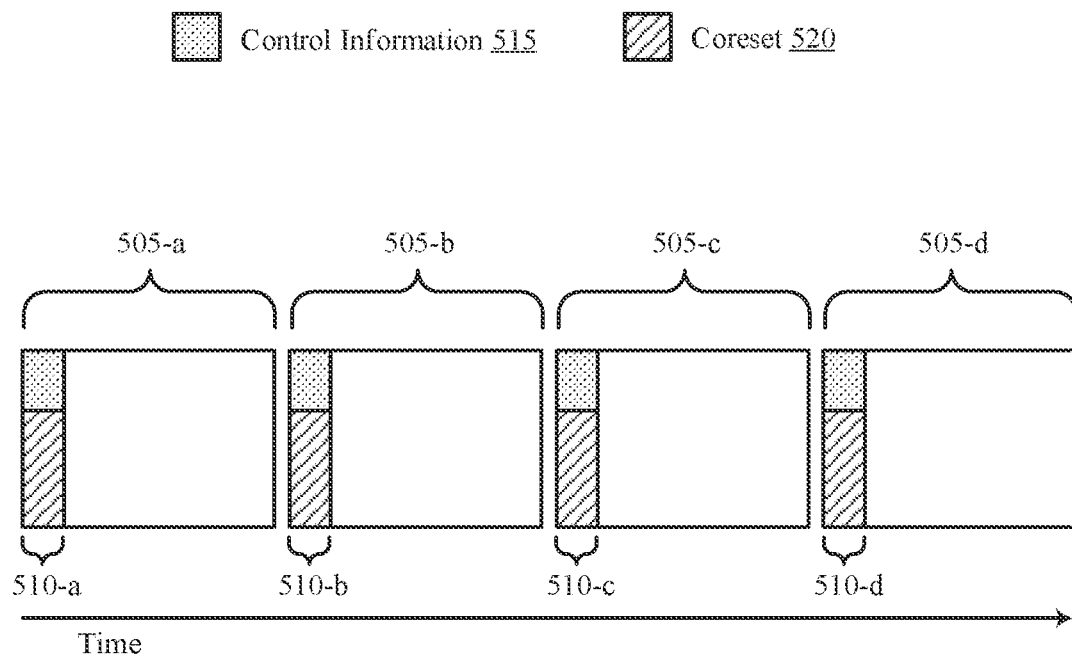
FIG. 5 illustrates an example of a repetition schedule that supports message repetition for a random access procedure in accordance with aspects of the present disclosure.

FIG. 5 illustrates an example of a repetition schedule 500 that supports message repetition for a random access procedure in accordance with aspects of the present disclosure. In some examples, the repetition schedule 500 may illustrate how a base station 105 may transmit a number of instances of the control information (and/or RAR) in a number of consecutive (or non-consecutive) slots. Based on using the repetition schedule 500, a UE 115 may be more likely to connect to the base station 105 using a random access procedure during a low connectivity condition.

The repetition schedule 500 may include a number of slots, such as slot 505-a, slot 505-b, slot 505-c, and slot 505-d. A control resource set (coreset) 520 may be inside each slot, and an instance of a control information 515 may be included inside each coreset 520. In some examples, each instance of the control information 515 may be in the same location in each of the number of slots 505. For example, the base station 105 may transmit all instances of control information 515 associated with the same RAR such that the UE 115 may receive the control information at monitoring occasions 510-*a*, 510-*b*, 510-*c*, and 510-*d* (e.g., at the same location in each consecutive slot). Similarly, the base station 105 may transmit repeated instances of the RAR associated with the repeated control information over a channel (e.g., PDSCH) of each of slot 505-*a*, slot 505-*b*, slot 505-*c*, and slot 505-*d*. In other instances, the base station 105 may transmit a single instance of the RAR associated with the repeated control information.

Additionally, or alternatively, each instance of the control information 515 may be associated with the same repetition level, and the UE 115 may identify the repetition level of each instance of the control information 515 to identify which instances of control information 515 may be linked (e.g., combined). For example, each instance of the control information 515 may include the same number of CCEs. Additionally, or alternatively, each instance of the control information 515 may be associated with an index that the UE 115 may use to link (e.g., combine) a number of instances of the control information 515. In some cases, one or more instances of the control information 515 may be in different locations in each of the number of slots 505, such as slot 505-*a*, slot 505-*b*, slot 505-*c*, and slot 505-*d*.

Figure 6:
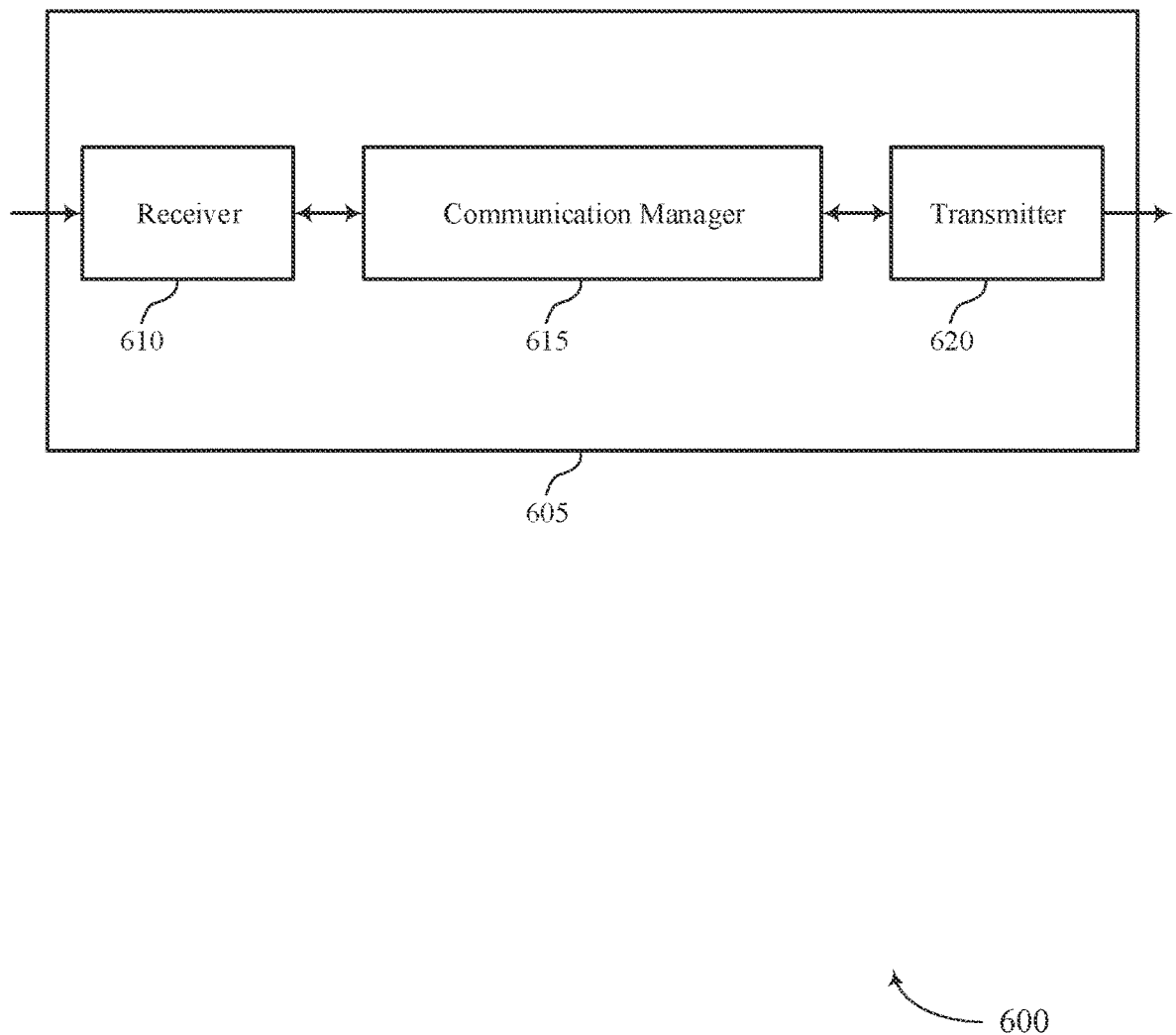
FIGS. 6 and 7 show block diagrams of devices that support message repetition for a random access procedure in accordance with aspects of the present disclosure.

FIG. 6 shows a block diagram 600 of a device 605 that supports message repetition for a random access procedure in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to message repetition for random access procedure, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may receive an indication of a random access response (RAR) window configuration. The RAR window configuration may indicate one or more RAR windows support a single instance of control information and indicate one or more RAR windows support repeated instances of the control information. The RAR window configuration may indicate one or more first segments of a RAR window support a single instance of control information and indicate one or more second segments of the RAR window support repeated instances of the control information. The communication manager 615 may determine, based on the RAR window configuration, whether a random access procedure is operating within the one or more first segments of the RAR window or operating within the one or more second segments. The communications manager 615 may determine, based on the RAR window configuration, whether a segment of a current RAR window supports a single instance of control information or repeated instances of the control information. The communication manager 615 may monitor, based on the determining, one or more slots of the RAR window for the single instance of the control information or the repeated instances of the control information. The communication manager 615 may monitor, based on determining the current RAR window or a segment of a current RAR window supports a single instance of control information, for the single instance of the control information in one or more slots of the RAR window. The communication manager 615 may monitor, based on determining the current RAR window or a segment of a current RAR window supports repeated instances of control information, the repeated instances of the control information in multiple slots of the RAR window. The communication manager 615 may be configured to perform one or more of the steps, or aspects of the steps, described with respect to FIGS. 14 and 15. The communication manager 615 may be an example of aspects of the communication manager 910 described herein.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

In some examples, the communication manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communication manager 615 as described herein may be implemented to realize one or more potential advantages. One implementation may allow a UE 115 to connect to a base station 105 while operating in a low connectivity condition with minimal signaling and low overhead, resulting in increased processing efficiency. Further, another implementation may allow the UE 115 to increase the likelihood of successfully decoding the control information associated with a RAR, reducing the chance that the UE 115 may need to repeat the entire random access procedure. This may save processing time, reduce latency, and improve power savings and improve battery life. Likewise, another implementation may allow the UE 115 to increase the likelihood of successfully decoding a RAR, reducing the chance that the UE 115 may need to repeat the entire random access procedure. Again, this may save processing time, reduce latency, and improve power savings and improve battery life.

Figure 9:
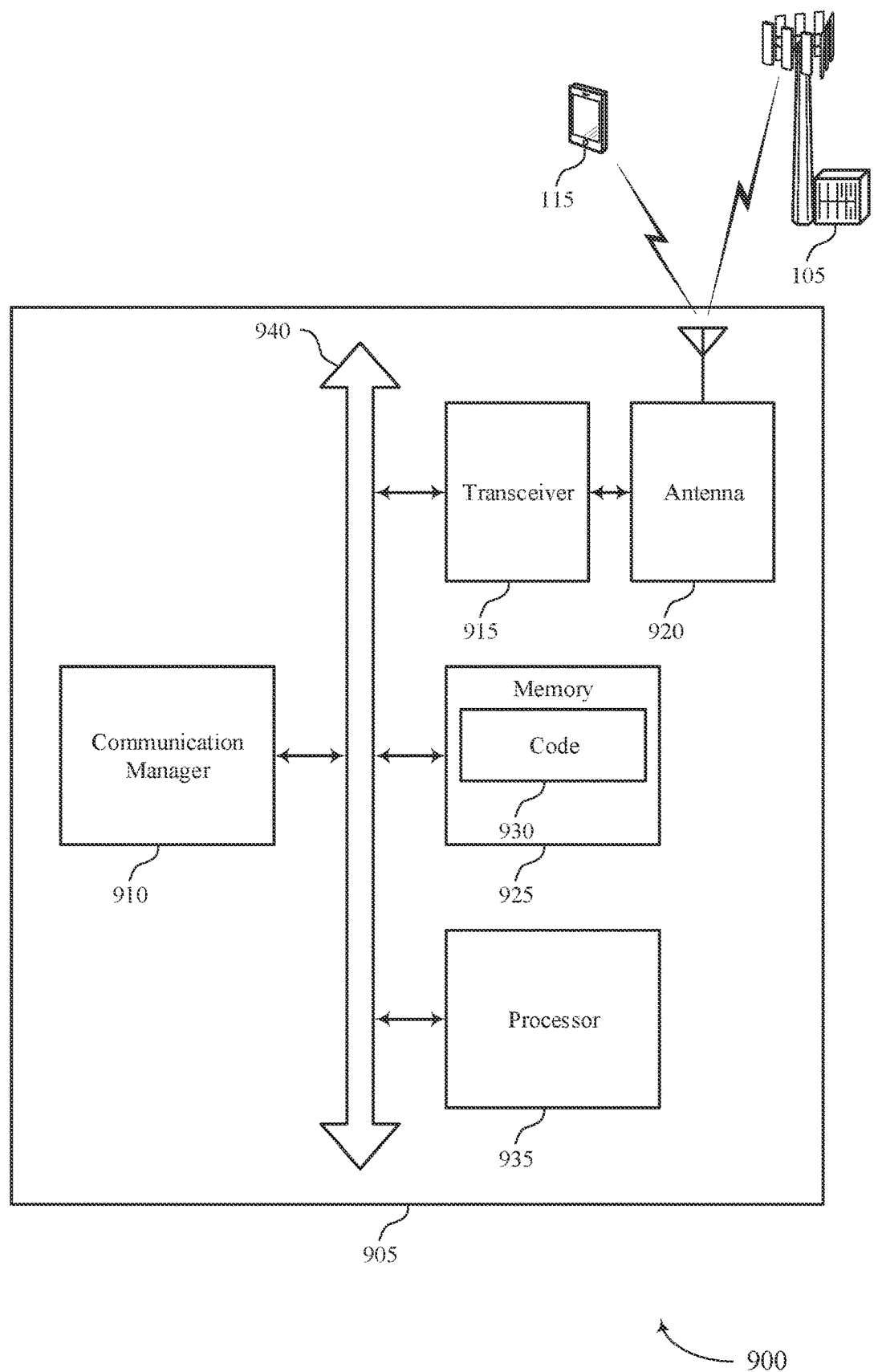
FIG. 9 shows a diagram of a system including a device that supports message repetition for a random access procedure in accordance with aspects of the present disclosure.

Based on techniques for efficiently communicating a RAR window configuration that enables a UE 115 to perform soft-combining during a RAR window of a random access procedure, a processor of the UE 115 (e.g., controlling the receiver 610, the transmitter 620 or a transceiver 915 as described with respect to FIG. 9) may increase system efficiency and decrease unnecessary processing at a device.

Figure 7:
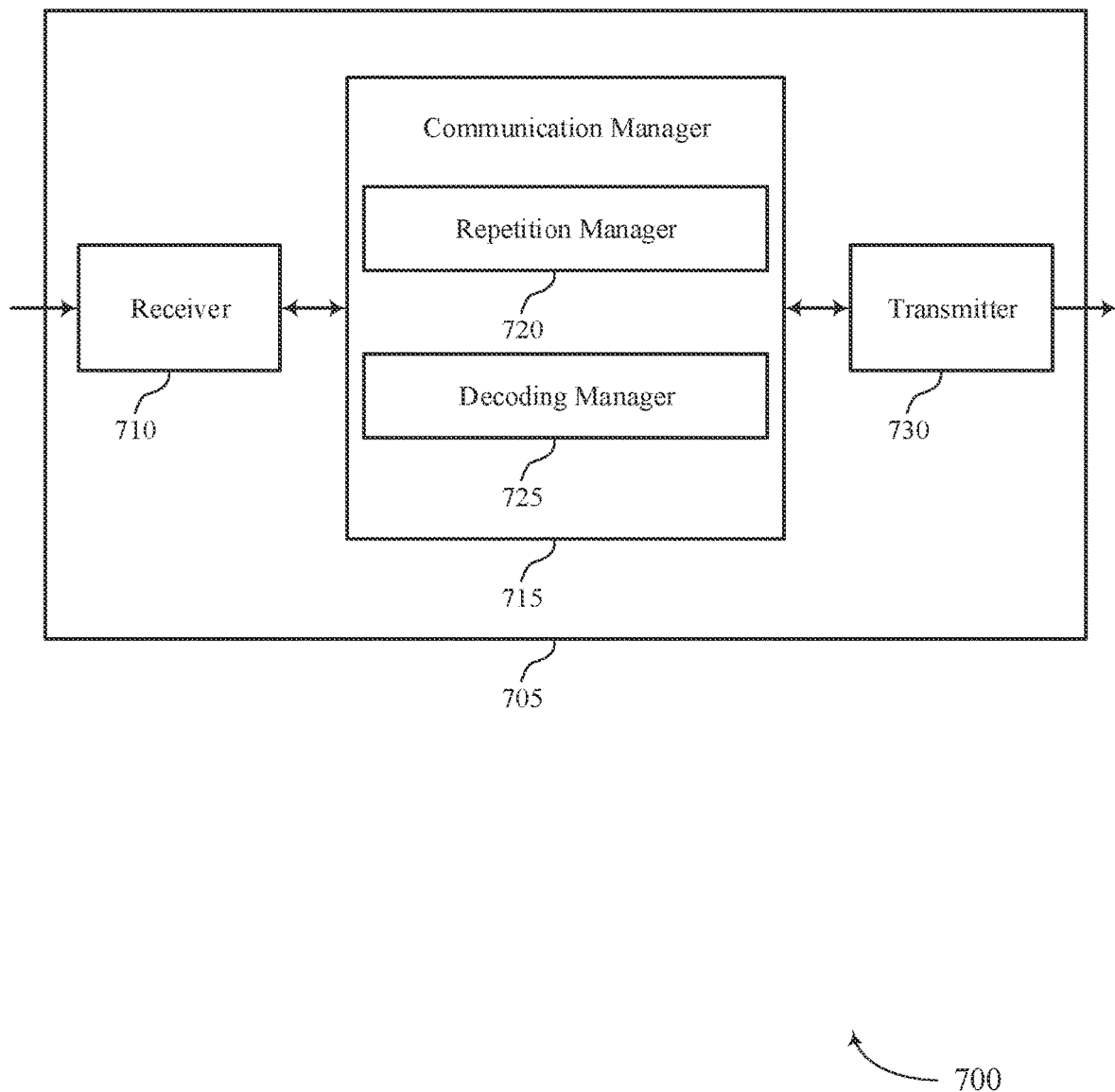

FIG. 7 shows a block diagram 700 of a device 705 that supports message repetition for a random access procedure in accordance with aspects of the present disclosure. The device 705 may be an example of aspects of a device 605, or a UE 115 as described herein. The device 705 may include a receiver 710, a communication manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to message repetition for random access procedure, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include a repetition manager 720 and a decoding manager 725. The communication manager 715 may be an example of aspects of the communication manager 910 described herein.

The repetition manager 720 may determine, based on a RAR window configuration, whether a random access procedure is operating within one or more first segments of a RAR window that support a single instance of control information or operating within one or more second segments of the RAR window that support repeated instances of the control information. The repetition manager 720 may determine whether a segment of a current RAR window supports a single instance of control information or repeated instances of the control information. In this regard, the repetition manager 720 may be configured to identify a number of repetitions, a repetition level, an index, a location, and/or any other information regarding the transmission of the control information (including any repetitions) and/or the RAR (including any repetitions) in a segment of the RAR window. The repetition parameters identified by the repetition manager 720 may enable a UE to determine which transmissions are instances of the control information (and/or the RAR) such that the UE may know which transmissions to combine. In some instances, the repetition manager 720 is further configured to monitor, based on what type of RAR window or segment the random access procedure is operating in (e.g., single instance or repeated instances), one or more slots of the RAR window for the single instance of the control information or the repeated instances of the control information.

The decoding manager 725 may decode the control information and/or the random access response received as part of the random access procedure based on combining the instances.

The transmitter 730 may transmit signals generated by other components of the device 705. In some examples, the transmitter 730 may be collocated with a receiver 710 in a transceiver module. For example, the transmitter 730 may be an example of aspects of the transceiver 915 described with reference to FIG. 9. The transmitter 730 may utilize a single antenna or a set of antennas.

Figure 8:
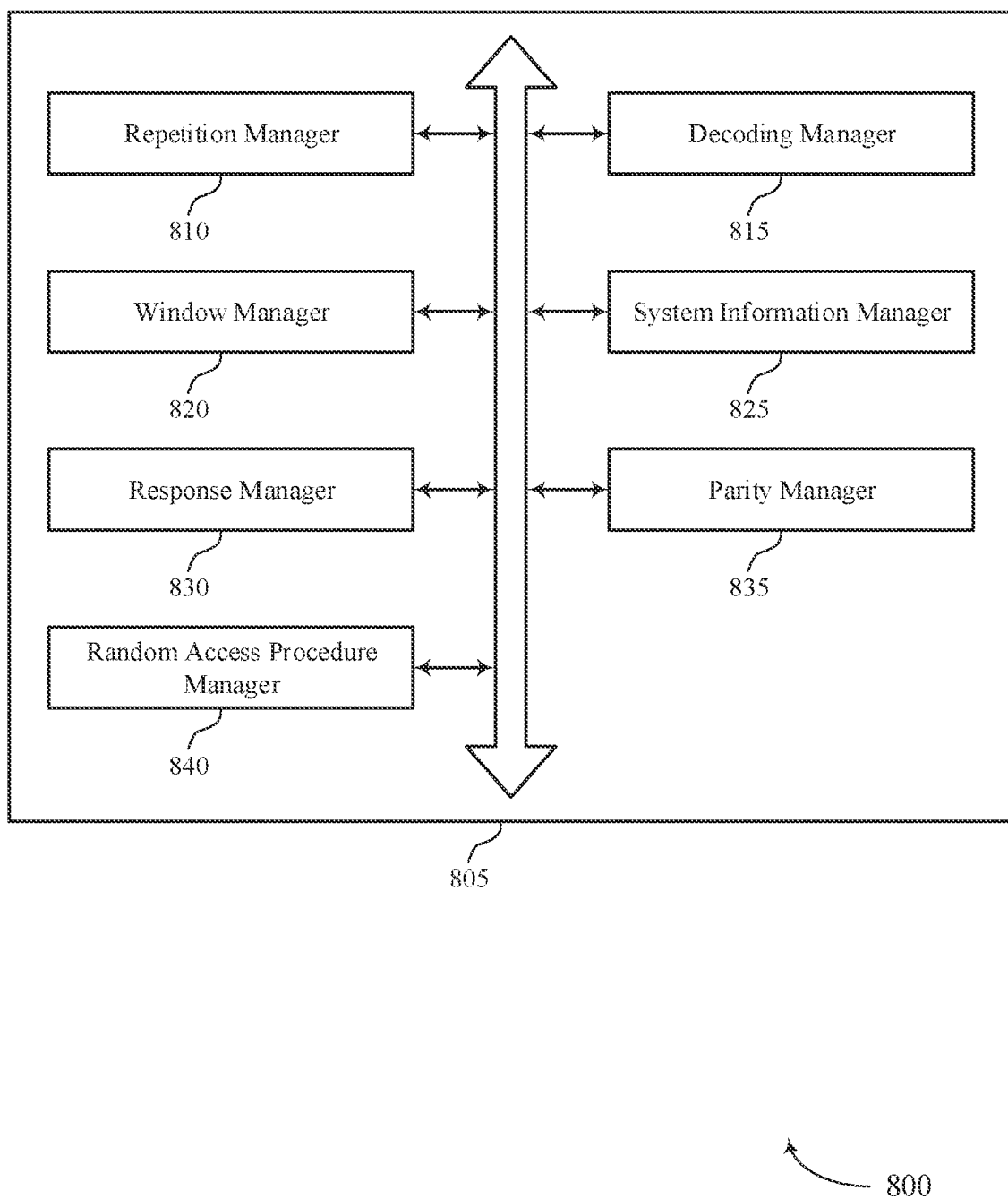
FIG. 8 shows a block diagram of a communication manager that supports message repetition for a random access procedure in accordance with aspects of the present disclosure.

FIG. 8 shows a block diagram 800 of a communication manager 805 that supports message repetition for a random access procedure in accordance with aspects of the present disclosure. The communication manager 805 may be an example of aspects of a communication manager 615, a communication manager 715, or a communication manager 910 described herein. The communication manager 805 may include a repetition manager 810, a decoding manager 815, a window manager 820, a system information manager 825, a response manager 830, a parity manager 835, and a random access procedure manager 840. Each of these modules may communicate, directly or indirectly, with one another (e.g., via one or more buses).

The repetition manager 810 may determine, based on a RAR window configuration, whether a random access procedure is operating within one or more first segments of a RAR window that support a single instance of control information or operating within one or more second segments of the RAR window that support repeated instances of the control information. In this regard, the repetition manager may be configured to identify a number of repetitions, a repetition level, an index, a location, and/or any other information regarding the transmission of the control information (including any repetitions) and/or the RAR (including any repetitions) in a segment of the RAR window. The repetition parameters identified by the repetition manager 720 may enable a UE to determine which transmissions are instances of the control information (and/or the RAR) such that the UE may know which transmissions to combine. In some instances, the repetition manager 720 is further configured to monitor, based on what type of RAR window or segment the random access procedure is operating in (e.g., single instance or repeated instances), one or more slots of the RAR window for the single instance of the control information or the repeated instances of the control information.

The decoding manager 815 may decode the control information and/or random access response received as part of the random access procedure based on combining the instances.

The window manager 820 may receive and/or process an indication of a random access response (RAR) window configuration. The RAR window configuration may indicate that one or more first RAR windows support a single instance of control information and indicate that one or more second RAR windows support repeated instances of the control information. The window manager 820 may determine, based on the RAR window configuration, whether a current RAR window (or segment of the current RAR window) supports a single instance of control information or repeated instances of the control information. In some instances, the window manager 820 may monitor, based on determining whether the current RAR window (or segment of the current RAR window) supports a single instance of control information or repeated instances of the control information, one or more slots of the current RAR window for the single instance of the control information or the repeated instances of the control information. In some instances, the window manager 820 and the repetition manager 810 operate together to determine repetition parameters of a RAR window or segment(s) of the RAR window.

The system information manager 825 may receive system information that includes an indication of a RAR window configuration. In some instances, the system information manager 825 is configured to determine the RAR window configuration based on the indication. In some examples, the system information manager 825 may identify an index value of the configuration included in the system information. In some examples, the system information manager 825 may retrieve information about the RAR window configuration based on identifying the index value (e.g., using a LUT or other mapping). In some examples, the system information manager 825 may identify information about a repetition level associated with one or more RAR windows and/or segment(s) of one or more RAR windows based on the indication included in the system information.

In some examples, one or more of the functionalities of the repetition manager 810, window manager 820, and/or system information manager 825 are combined in one of the repetition manager 810, window manager 820, and/or system information manager 825.

The response manager 830 may identify a location of the random access response in a data channel based on one or more instances of the control information, including combining multiple instances of the control information in some instances. Decoding the random access response may be based on identifying the location of the random access response in the data channel based on the control information. In some cases, the random access response includes a message2 of the random access procedure.

The parity manager 835 may perform a parity check on the control information generated from combining the instances. In some examples, receiving and/or decoding the random access response is based on performing the parity check.

The random access procedure manager 840 may initiate the random access procedure. In some examples, the random access procedure manager 840 may transmit, to a base station, a random access request, where monitoring the set of slots is based on transmitting the random access request. In some examples, the random access procedure manager 840 may transmit, to a base station, a radio resource control connection request based on decoding the random access response.

FIG. 9 shows a diagram of a system 900 including a device 905 that supports message repetition for a random access procedure in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may receive an indication of a random access response (RAR) window configuration, the RAR window configuration indicating one or more first segments of a RAR window support a single instance of control information and indicating one or more second segments of the RAR window support repeated instances of the control information. The communication manager 910 may also determine, based on the RAR window configuration, whether a random access procedure is operating within the one or more first segments of the RAR window or operating within the one or more second segments. The communication manager 910 may also monitor, based on the determining, one or more slots of the RAR window for the single instance of the control information or the repeated instances of the control information. The communication manager 910 may be configured to perform one or more of the steps, or aspects of the steps, described with respect to FIGS. 14 and 15.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920 (e.g., two, three, four, five, six, etc. antennas), which may be capable of concurrently transmitting or receiving multiple wireless transmissions.

The memory 925 may include random access memory (RAM) and/or read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting message repetition for random access procedure).

Figure 10:
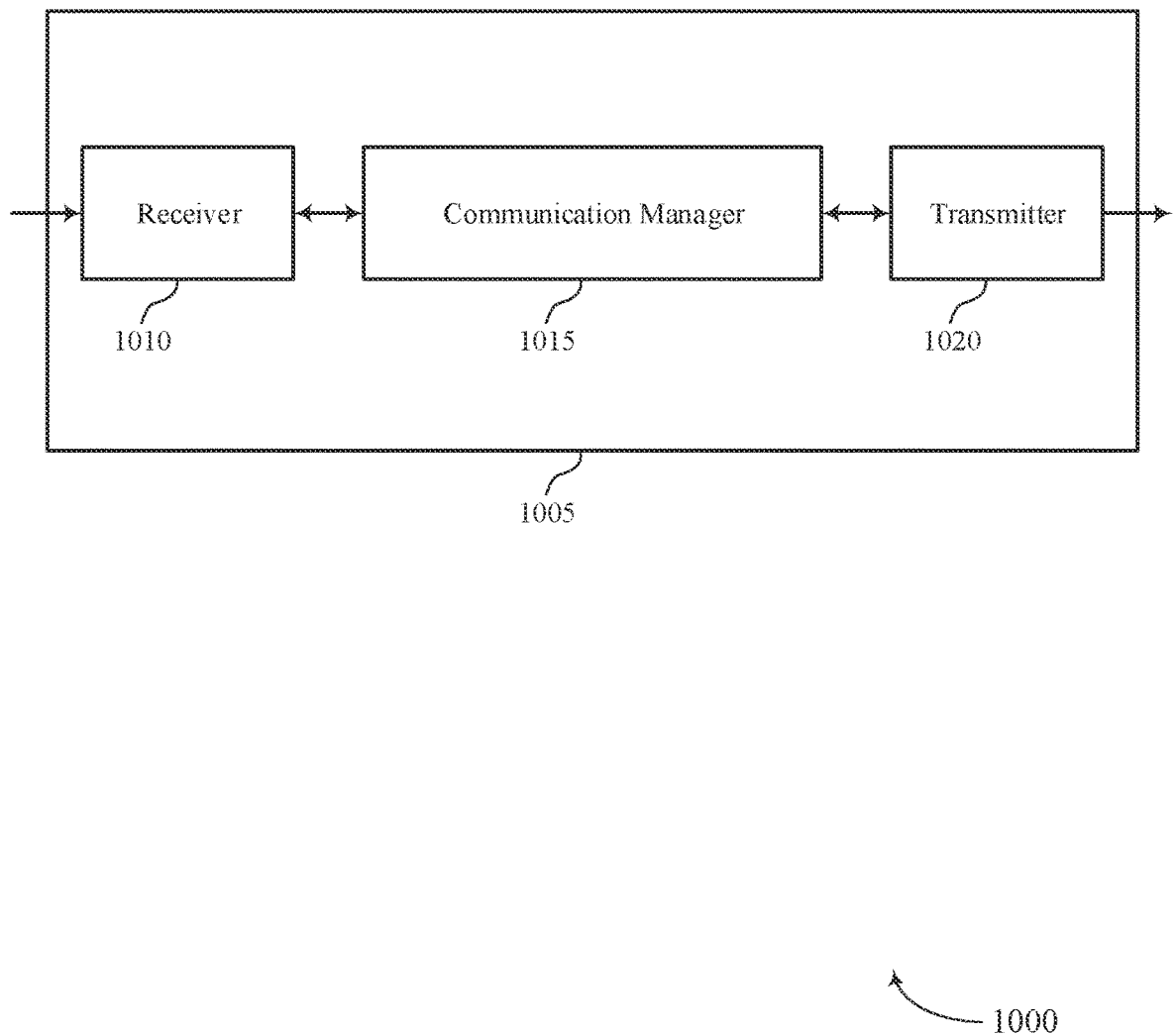
FIGS. 10 and 11 show block diagrams of devices that support message repetition for a random access procedure in accordance with aspects of the present disclosure.

FIG. 10 shows a block diagram 1000 of a device 1005 that supports message repetition for a random access procedure in accordance with aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to message repetition for random access procedure, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may transmit an indication of a random access response (RAR) window configuration. The RAR window configuration may indicate one or more RAR windows support a single instance of control information and indicate one or more RAR windows support repeated instances of the control information. The RAR window configuration may indicate one or more first segments of a RAR window support a single instance of control information and indicate one or more second segments of the RAR window support repeated instances of the control information. The communication manager 1015 may determine, based on the RAR window configuration, whether a random access procedure is operating within the one or more first segments of the RAR window or operating within the one or more second segments. The communications manager 1015 may determine, based on the RAR window configuration, whether a segment of a current RAR window supports a single instance of control information or repeated instances of the control information. The communication manager 1015 may transmit the single instance of the control information or the repeated instances of the control information in one or more slots of the current RAR window. The communication manager 1015 may transmit, based on determining the current RAR window or a segment of a current RAR window supports a single instance of control information, the single instance of the control information in one or more slots of the RAR window. The communication manager 1015 may transmit, based on determining the current RAR window or a segment of a current RAR window supports a repeated instances of control information, the repeated instances of the control information in multiple slots of the RAR window. In some instances, the communication manager 1015 may select the RAR window configuration from a plurality of available RAR window configurations. In some examples, the communication manager 1015 may select the RAR window configuration based on communication link, network load, signal strength, interference, and/or combinations thereof. The communication manager 1015 may be configured to perform one or more of the steps, or aspects of the steps, described with respect to FIGS. 16 and 17. The communication manager 1015 may be an example of aspects of the communication manager 1310 described herein.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
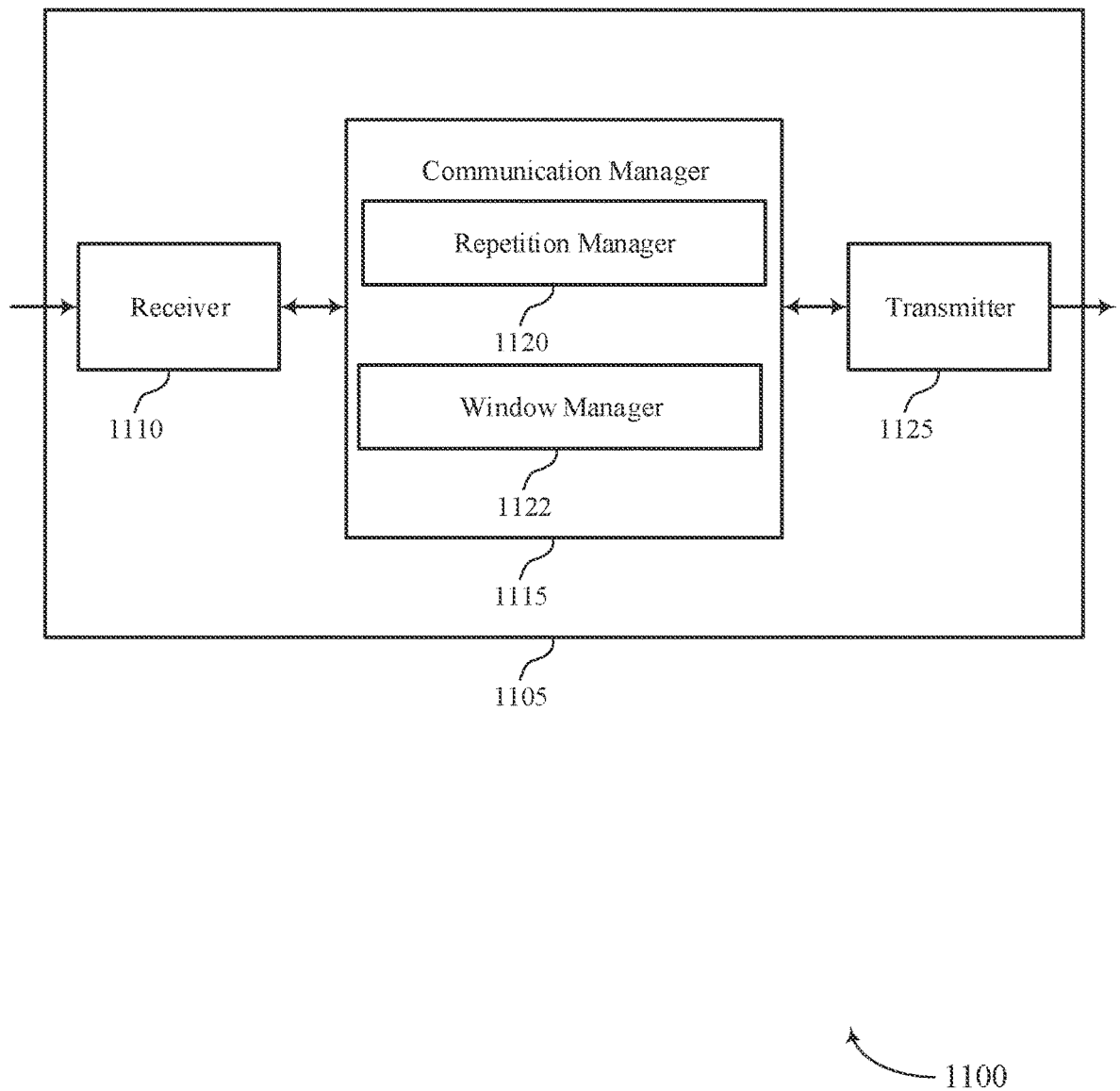

FIG. 11 shows a block diagram 1100 of a device 1105 that supports message repetition for a random access procedure in accordance with aspects of the present disclosure. The device 1105 may be an example of aspects of a device 1005, or a base station 105 as described herein. The device 1105 may include a receiver 1110, a communication manager 1115, and a transmitter 1125. The device 1105 may also include a processor. Each of these components may be in communication with one another (e.g., via one or more buses).

The receiver 1110 may receive information such as packets, user data, or control information associated with various information channels (e.g., control channels, data channels, and information related to message repetition for random access procedure, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include a repetition manager 1120 and/or a window manager 1122. The communication manager 1115 may be an example of aspects of the communication manager 1310 described herein.

The repetition manager 1120 may determine, based on a RAR window configuration, whether a random access procedure is operating within one or more first segments of a RAR window that support a single instance of control information or operating within one or more second segments of the RAR window that support repeated instances of the control information. The repetition manager 1120 may determine, based on a RAR window configuration, whether a segment of a current RAR window supports a single instance of control information or repeated instances of the control information. The repetition manager 1120 may be configured to identify one or more repetition parameters (e.g., number of repetitions, spacing of repetitions, etc.) for one or more segments of a RAR window.

The window manager 1122 may transmit an indication of a random access response (RAR) window configuration. The RAR window configuration may indicate that one or more first RAR windows support a single instance of control information and indicate that one or more second RAR windows support repeated instances of the control information. The window manager 1122 may determine, based on the RAR window configuration, whether a current RAR window (or segment of the current RAR window) supports a single instance of control information or repeated instances of the control information. In some instances, the window manager 1122 may transmit, based on determining whether the current RAR window (or segment of the current RAR window) supports a single instance of control information or repeated instances of the control information, the single instance of the control information or the repeated instances of the control information in one or more slots of the current RAR window. In some instances, the window manager 1122 may select the RAR window configuration from a plurality of available RAR window configurations. In some examples, the window manager 1122 may select the RAR window configuration based on communication link, network load, signal strength, interference, and/or combinations thereof. In some instances, the window manager 1122 and the repetition manager 1120 operate together to determine repetition parameters of a RAR window or segment(s) of the RAR window.

The transmitter 1125 may transmit signals generated by other components of the device 1105. In some examples, the transmitter 1125 may be collocated with a receiver 1110 in a transceiver module. For example, the transmitter 1125 may be an example of aspects of the transceiver 1320 described with reference to FIG. 13. The transmitter 1125 may utilize a single antenna or a set of antennas.

Figure 12:
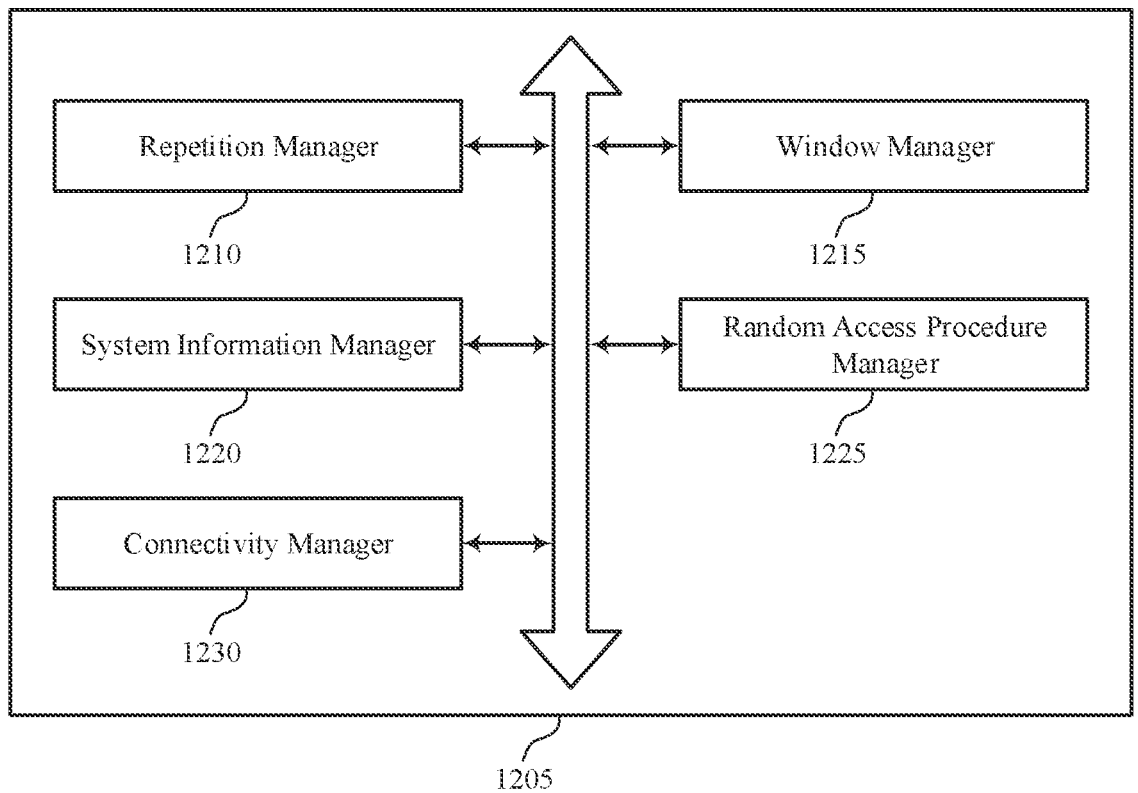
FIG. 12 shows a block diagram of a communication manager that supports message repetition for a random access procedure in accordance with aspects of the present disclosure.

FIG. 12 shows a block diagram 1200 of a communication manager 1205 that supports message repetition for a random access procedure in accordance with aspects of the present disclosure. The communication manager 1205 may be an example of aspects of a communication manager 1015, a communication manager 1115, or a communication manager 1310 described herein. The communication manager 1205 may include a repetition manager 1210, a window manager 1215, a system information manager 1220, a random access procedure manager 1225, and a connectivity manager 1230. Each of these modules may communicate, directly or indirectly, with one another (e.g., via one or more buses).

The repetition manager 1210 may determine, based on a RAR window configuration, whether a random access procedure is operating within one or more first segments of a RAR window that support a single instance of control information or operating within one or more second segments of the RAR window that support repeated instances of the control information. The repetition manager 1210 may determine, based on a RAR window configuration, whether a segment of a current RAR window supports a single instance of control information or repeated instances of the control information. The repetition manager 1210 may be configured to identify one or more repetition parameters (e.g., number of repetitions, spacing of repetitions, etc.) for one or more segments of a RAR window.

The window manager 1215 may transmit an indication of a random access response (RAR) window configuration. The RAR window configuration may indicate that one or more first RAR windows support a single instance of control information and indicate that one or more second RAR windows support repeated instances of the control information. The window manager 1215 may determine, based on the RAR window configuration, whether a current RAR window (or segment of the current RAR window) supports a single instance of control information or repeated instances of the control information. In some instances, the window manager 1215 may transmit, based on determining whether the current RAR window (or segment of the current RAR window) supports a single instance of control information or repeated instances of the control information, the single instance of the control information or the repeated instances of the control information in one or more slots of the current RAR window. In some instances, the window manager 1215 may select the RAR window configuration from a plurality of available RAR window configurations. In some examples, the window manager 1215 may select the RAR window configuration based on communication link, network load, signal strength, interference, and/or combinations thereof. In some instances, the window manager 1215 and the repetition manager 1210 operate together to determine repetition parameters of a RAR window or segment(s) of the RAR window.

The system information manager 1220 may transmit system information that includes an indicator of a RAR window configuration. In some examples, an index value identifies the RAR window configuration. The indicator of the RAR window configuration included in the system information may include the index value.

The random access procedure manager 1225 may receive a radio resource control (RRC) connection request from a UE in response to transmitting a single instance or repeated instances of control information (and/or RAR). The random access procedure manager 1225 may advance the random access procedure upon receiving the RRC connection request. In some examples, the random access procedure manager 1225 may receive, from a user equipment, a random access request, where transmitting the control information, a single instance and/or repeated instances, is based on receiving the random access request.

The connectivity manager 1230 may identify that the base station is operating in a connectivity condition that satisfies a signal quality threshold. The connectivity manager 1230 may be configured to communicate the connectivity condition to the window manager 1215. The window manager 1215 may utilize the connectivity condition to select a RAR window configuration.

Figure 13:
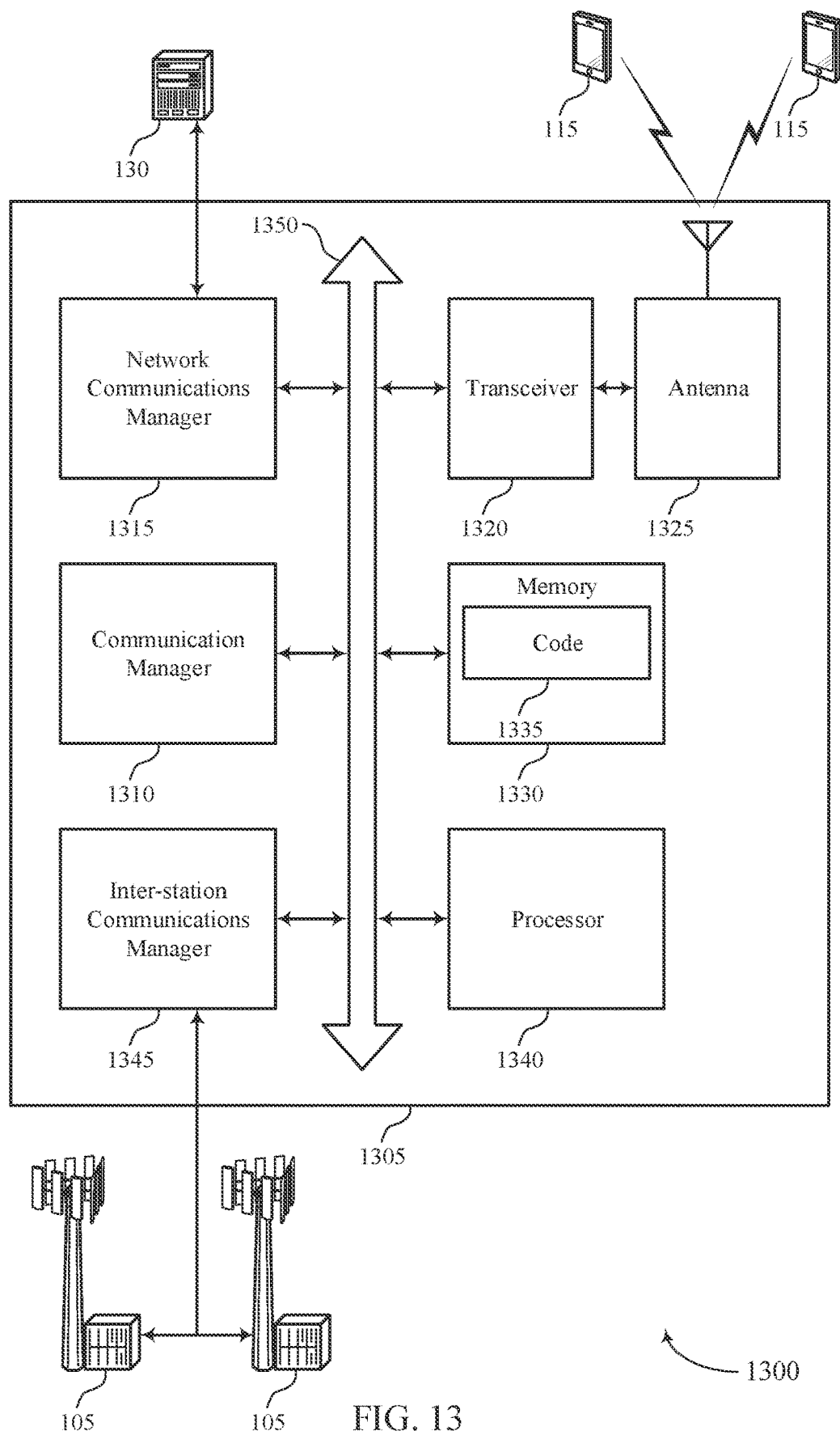
FIG. 13 shows a diagram of a system including a device that supports message repetition for a random access procedure in accordance with aspects of the present disclosure.

FIG. 13 shows a diagram of a system 1300 including a device 1305 that supports message repetition for a random access procedure in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may transmit an indication of a random access response (RAR) window configuration. The RAR window configuration may indicate one or more RAR windows support a single instance of control information and indicate one or more RAR windows support repeated instances of the control information. The RAR window configuration may indicate one or more first segments of a RAR window support a single instance of control information and indicate one or more second segments of the RAR window support repeated instances of the control information. The communication manager 1310 may determine, based on the RAR window configuration, whether a random access procedure is operating within the one or more first segments of the RAR window or operating within the one or more second segments. The communications manager 1015 may determine, based on the RAR window configuration, whether a segment of a current RAR window supports a single instance of control information or repeated instances of the control information. The communication manager 1310 may transmit the single instance of the control information or the repeated instances of the control information in one or more slots of the current RAR window. The communication manager 1310 may transmit, based on determining the current RAR window or a segment of a current RAR window supports a single instance of control information, the single instance of the control information in one or more slots of the RAR window. The communication manager 1310 may transmit, based on determining the current RAR window or a segment of a current RAR window supports a repeated instances of control information, the repeated instances of the control information in multiple slots of the RAR window. In some instances, the communication manager 1310 may select the RAR window configuration from a plurality of available RAR window configurations. In some examples, the communication manager 1310 may select the RAR window configuration based on communication link, network load, signal strength, interference, and/or combinations thereof. The communication manager 1310 may be configured to perform one or more of the steps, or aspects of the steps, described with respect to FIGS. 16 and 17.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325 (e.g., two, three, four, five, six, etc. antennas), which may be capable of concurrently transmitting or receiving multiple wireless transmissions.

The memory 1330 may include RAM and/or ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting message repetition for random access procedure).

The inter-station communications manager 1345 may manage communications with other base station 105. The inter-station communications manager 1345 may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
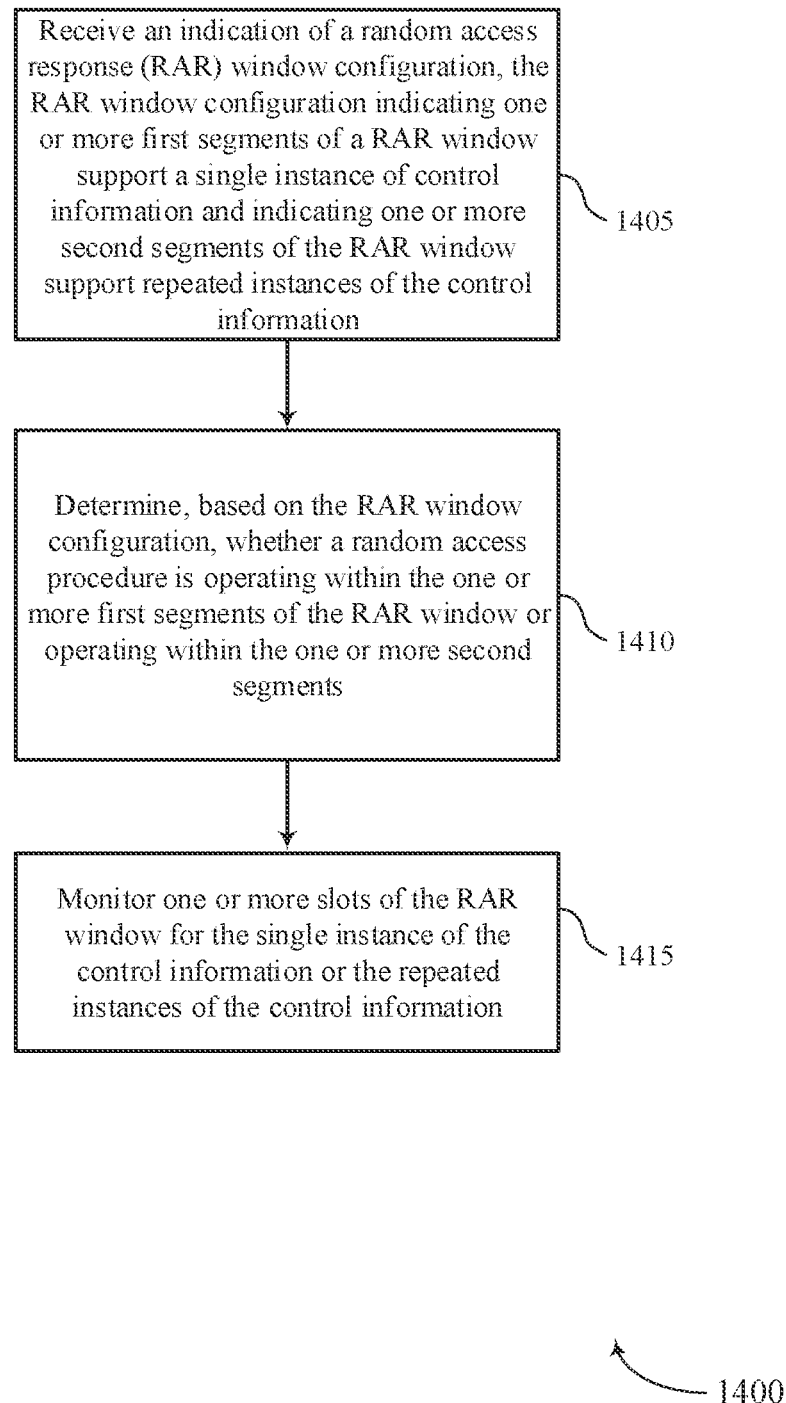
FIGS. 14 through 17 show flowcharts illustrating methods that support message repetition for a random access procedure in accordance with aspects of the present disclosure.

FIG. 14 shows a flowchart illustrating a method 1400 that supports message repetition for a random access procedure in accordance with aspects of the present disclosure. The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally, or alternatively, a UE may perform aspects of the described functions using special-purpose hardware.

At 1405, the UE may receive, from a base station, an indication of a random access response (RAR) window configuration. The RAR window configuration may indicate one or more first segments of a RAR window support a single instance of control information and indicate one or more second segments of the RAR window support repeated instances of the control information. The RAR window configuration may indicate the RAR window includes an alternating pattern of the one or more first segments and the one or more second segments. The RAR window configuration may indicate that each of the one or more first segments has a first length and each of the one or more second segments has a second length. The second length may be different than the first length. The RAR window configuration may indicate the RAR window is contiguous or noncontiguous.

The receiving the indication of the RAR window configuration at 1405 may include receiving system information from the base station. The receiving the system information from the base station may include receiving at least one of a system information block (SIB) or a master information block (MIB). The receiving the system information from the base station may include receiving the system information via at least one of a physical broadcast channel (PBCH) or a physical downlink shared channel (PDSCH). The operations of 1405 may be performed according to the methods described herein. In some examples, aspects of the operations of 1405 may be performed by a communication manager as described with reference to FIGS. 6 through 9.

At 1410, the UE may determine, based on the RAR window configuration, whether a random access procedure is operating within the one or more first segments of the RAR window or operating within the one or more second segments. The determining whether the random access procedure is operating within the one or more first segments of the RAR window or operating within the one or more second segments may include determining whether a scheduled RAR communication is scheduled within the one or more first segments of the RAR window or scheduled within the one or more second segments. The scheduled RAR communication may include at least one of a physical downlink shared channel (PDSCH) message or a physical downlink control channel (PDCCH) message. The operations of 1410 may be performed according to the methods described herein. In some examples, aspects of the operations of 1410 may be performed by a communication manager as described with reference to FIGS. 6 through 9.

At 1415, the UE may monitor, based on the determination at 1410, one or more slots of the RAR window for the single instance of the control information or the repeated instances of the control information. The operations of 1415 may be performed according to the methods described herein. In some examples, aspects of the operations of 1415 may be performed by a communication manager as described with reference to FIGS. 6 through 9.

The method 1400 may also include identifying, based on the received indication of the RAR window configuration, the RAR window configuration. The identifying the RAR window configuration may include mapping one or more bits of the received indication of the RAR window configuration to parameters of the RAR window configuration. The mapping one or more bits of the received indication of the RAR window configuration to the parameters of the RAR window configuration may include using a look-up table. The mapping one or more bits of the received indication of the RAR window configuration to the parameters of the RAR window configuration may include selecting a first look-up table from a plurality of available look-up tables.

In some instances, the determining whether the random access procedure is operating within the one or more first segments of the RAR window or operating within the one or more second segments includes determining the random access procedure is operating within the one or more second segments, and the monitoring the one or more slots of the RAR window includes monitoring a plurality of slots of the RAR window for the repeated instances of the control information. In some examples, the method 1400 includes identifying a repetition level associated with the one or more second segments. The monitoring the plurality of slots of the RAR window for the repeated instances of the control information may be based on the identified repetition level. In some examples, the method 1400 includes receiving, from the base station based on the monitoring, two or more of the repeated instances of the control information, combining the received, repeated instances of the control information to form a combined control information; and decoding the combined control information. The combining the received, repeated instances of the control information to form the combined control information may include performing soft combining. The method 1400 may include monitoring for a RAR message in a data channel based on the decoded combined control information.

In some instances, the determining whether the random access procedure is operating within the one or more first segments of the RAR window or operating within the one or more second segments includes determining the random access procedure is operating within the one or more second segments and the method 1400 may further include monitoring, based on the determining, for repeated instances of a RAR message in a data channel.

Figure 15:
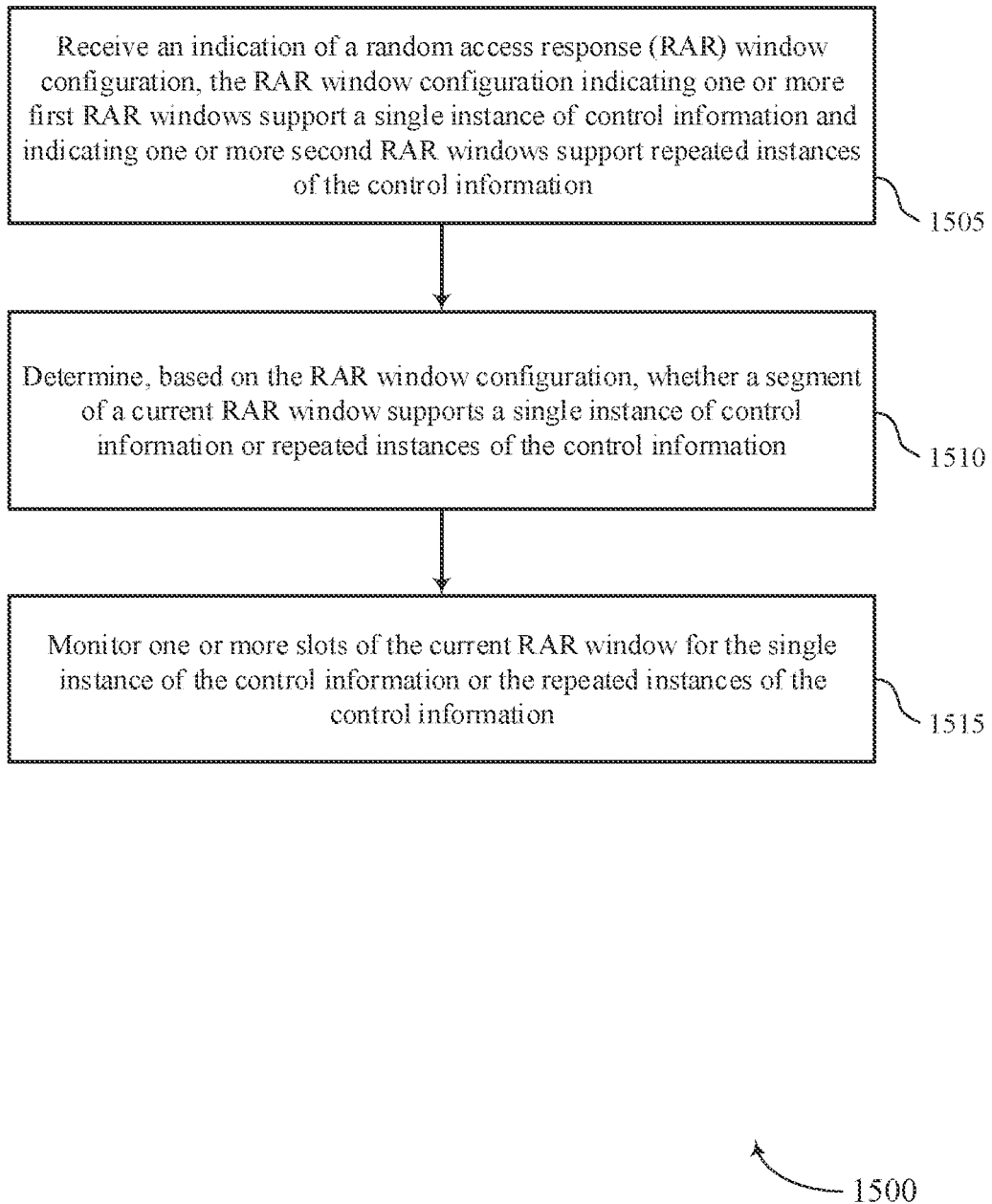

FIG. 15 shows a flowchart illustrating a method 1500 that supports message repetition for a random access procedure in accordance with aspects of the present disclosure. The operations of method 1500 may be implemented by a UE 115 or its components as described herein. For example, the operations of method 1500 may be performed by a communication manager as described with reference to FIGS. 6 through 9. In some examples, a UE may execute a set of instructions to control the functional elements of the UE to perform the described functions. Additionally, or alternatively, a UE may perform aspects of the described functions using special-purpose hardware.

At 1505, the UE may receive, from a base station, an indication of a random access response (RAR) window configuration. The RAR window configuration may indicate one or more first RAR windows support a single instance of control information and indicate one or more second RAR windows support repeated instances of the control information. The receiving the indication of the RAR window configuration at 1505 may include receiving system information from the base station. The receiving the system information from the base station may include receiving at least one of a system information block (SIB) or a master information block (MIB). The receiving the system information from the base station may include receiving the system information via at least one of a physical broadcast channel (PBCH) or a physical downlink shared channel (PDSCH). The operations of 1505 may be performed according to the methods described herein. In some examples, aspects of the operations of 1505 may be performed by a communication manager as described with reference to FIGS. 6 through 9.

At 1510, the UE may determine, based on the RAR window configuration, whether a segment of a current RAR window supports a single instance of control information or repeated instances of the control information. In some instances, the determining whether the segment of the current RAR window supports the single instance of control information or the repeated instances of the control information includes determining whether the current RAR window is part of the one or more first RAR windows or the one or more second RAR windows. In some examples, the determining whether the current RAR window is part of the one or more first RAR windows or the one or more second RAR windows is based on a predefined pattern. In some instances, the predefined pattern is an alternating pattern of the one or more first RAR windows and the one or more second RAR windows. In some instances, the determining whether the current RAR window is part of the one or more first RAR windows or the one or more second RAR windows is based on system information for the current RAR window received from the base station. In some instances, the method 1500 includes receiving, from the base station, the system information for the current RAR window via at least one of a system information block (SIB), a master information block (MIB), remaining minimum system information (RMSI), a physical broadcast channel (PBCH), or a physical downlink shared channel (PDSCH).

In some instances, the determining whether the segment of the current RAR window supports the single instance of control information or the repeated instances of the control information includes determining whether the segment of the current RAR window is one or more first segments of the current RAR window supporting the single instance of control information or one or more second segments of the current RAR window supporting repeated instances of the control information. In some examples, the determining whether the segment of the current RAR window supports the single instance of control information or the repeated instances of the control information further includes determining whether a RAR communication is scheduled within the one or more first segments of the current RAR window or scheduled within the one or more second segments of the current RAR window. The scheduled RAR communication may include at least one of a physical downlink shared channel (PDSCH) message or a physical downlink control channel (PDCCH) message.

The operations of 1510 may be performed according to the methods described herein. In some examples, aspects of the operations of 1510 may be performed by a communication manager as described with reference to FIGS. 6 through 9.

At 1515, the UE may monitor, based on the determination at 1510, one or more slots of the current RAR window for the single instance of the control information or the repeated instances of the control information. The operations of 1515 may be performed according to the methods described herein. In some examples, aspects of the operations of 1515 may be performed by a communication manager as described with reference to FIGS. 6 through 9.

In some instances, the determining whether the segment of the current RAR window supports the single instance of control information or the repeated instances of the control information includes determining the segment of the current RAR window supports repeated instances of the control information and the monitoring the one or more slots of the current RAR window includes monitoring a plurality of slots of the current RAR window for the repeated instances of the control information. In some instances, the monitoring the plurality of slots of the current RAR window for the repeated instances of the control information is based on a repetition level. In some examples, the method 1500 may include receiving, from the base station based on the monitoring, two or more of the repeated instances of the control information, combining the received, repeated instances of the control information to form a combined control information; and decoding the combined control information. In some instances, the method 1500 may include monitoring for a RAR message in a data channel based on the decoded combined control information.

In some instances, the RAR window configuration further indicates one or more third RAR windows support a single instance of a RAR message and indicates one or more fourth RAR windows support repeated instances of the RAR message and the method 1500 further includes determining, based on the RAR window configuration, whether the segment of the current RAR window supports the single instance of the RAR message or the repeated instances of the RAR message; and monitoring, based on the determining whether the segment of the current RAR window supports the single instance of the RAR message or the repeated instances of the RAR message, a data channel for the single instance of the RAR message or the repeated instances of the RAR message. In some instances, the one or more third RAR windows at least partially overlap with the one or more first RAR windows. In some instances, the one or more fourth RAR windows at least partially overlap with the one or more second RAR windows. In some examples, the determining whether the segment of the current RAR window supports the single instance of the RAR message or the repeated instances of the RAR message includes determining the segment of the current RAR window supports the repeated instances of the RAR message and the monitoring the data channel includes monitoring for the repeated instances of a RAR message in a data channel.

Figure 16:
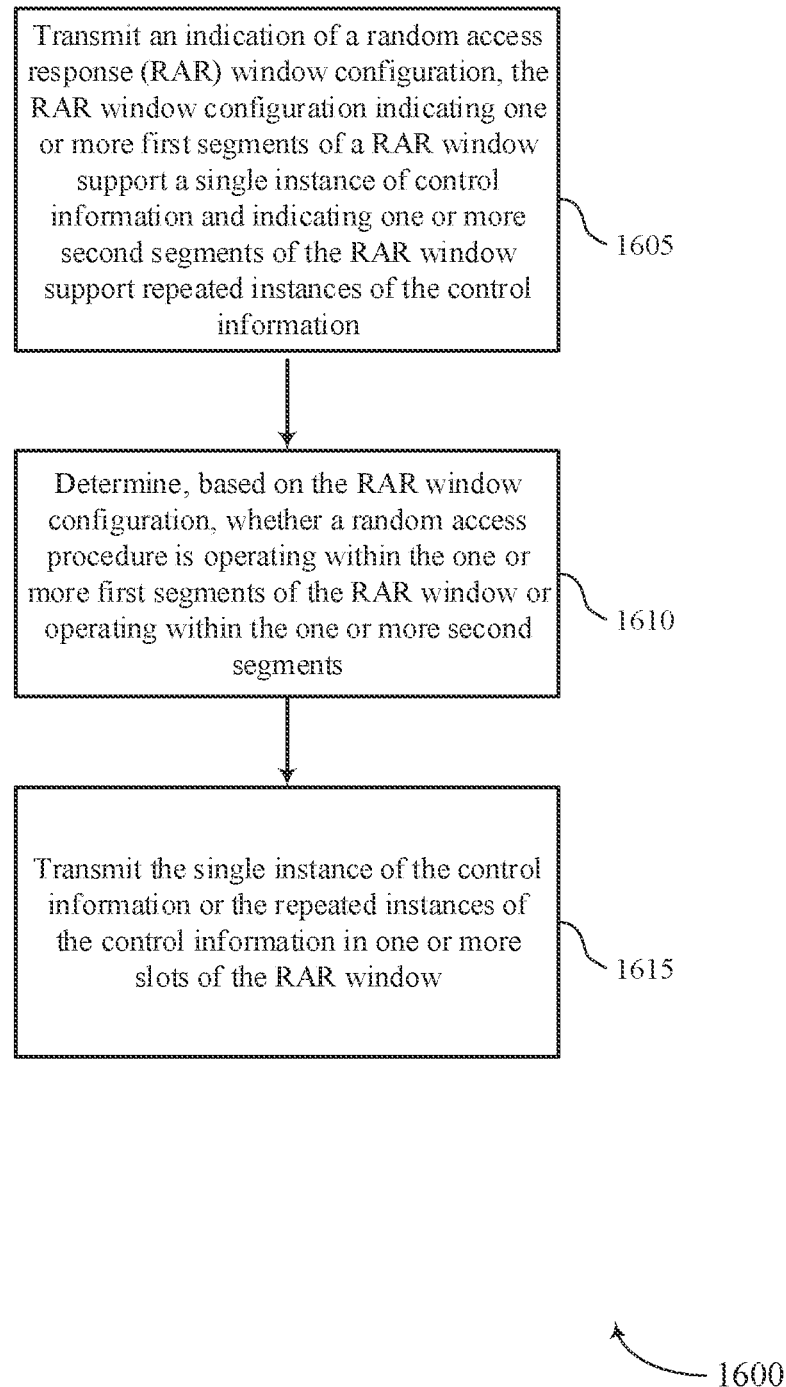

FIG. 16 shows a flowchart illustrating a method 1600 that supports message repetition for a random access procedure in accordance with aspects of the present disclosure. The operations of method 1600 may be implemented by a base station 105 or its components as described herein. For example, the operations of method 1600 may be performed by a communication manager as described with reference to FIGS. 10 through 13. In some examples, a base station may execute a set of instructions to control the functional elements of the base station to perform the described functions. Additionally, or alternatively, a base station may perform aspects of the described functions using special-purpose hardware.

At 1605, the base station may transmit an indication of a random access response (RAR) window configuration. The RAR window configuration may indicate one or more first segments of a RAR window support a single instance of control information and indicate one or more second segments of the RAR window support repeated instances of the control information. The RAR window configuration may indicate an alternating pattern of the one or more first segments and the one or more second segments. The RAR window configuration may indicate that each of the one or more first segments has a first length and each of the one or more second segments has a second length. The second length may be different than the first length. The RAR window configuration may indicate that the RAR window is contiguous or noncontiguous.

The transmitting the indication of the RAR window configuration may include transmitting system information. The transmitting the system information may include transmitting at least one of a system information block (SIB) or a master information block (MIB). The transmitting the system information may include transmitting the system information via at least one of a physical broadcast channel (PBCH) or a physical downlink shared channel (PDSCH). The transmitting the system information may include transmitting an indicator associated with the RAR window configuration. The operations of 1605 may be performed according to the methods described herein. In some examples, aspects of the operations of 1605 may be performed by a communication manager as described with reference to FIGS. 10 through 13.

At 1610, the base station may determine, based on the RAR window configuration, whether a random access procedure is operating within the one or more first segments of the RAR window or operating within the one or more second segments. In some instances, the determining whether the random access procedure is operating within the one or more first segments of the RAR window or operating within the one or more second segments includes determining whether a scheduled RAR communication is scheduled within the one or more first segments of the RAR window or scheduled within the one or more second segments. In some examples, the scheduled RAR communication includes at least one of a physical downlink shared channel (PDSCH) message or a physical downlink control channel (PDCCH) message. The operations of 1610 may be performed according to the methods described herein. In some examples, aspects of the operations of 1610 may be performed by a communication manager as described with reference to FIGS. 10 through 13.

At 1615, the base station may transmit, based on the determination at 1610, the single instance of the control information or the repeated instances of the control information in one or more slots of the RAR window. The operations of 1615 may be performed according to the methods described herein. In some examples, aspects of the operations of 1615 may be performed by a communication manager as described with reference to FIGS. 10 through 13.

The method 1600 may include the base station selecting the RAR window configuration from a plurality of available RAR window configurations. The selecting the RAR window configuration from a plurality of available RAR window configurations may be at least partially based on a connectivity condition between the base station and one or more user equipments (UEs).

In some instances, the determining whether the random access procedure is operating within the one or more first segments of the RAR window or operating within the one or more second segments includes determining the random access procedure is operating within the one or more second segments and the transmitting the single instance of the control information or the repeated instances of the control information includes transmitting the repeated instances of the control information in a plurality of slots of the RAR window. In some examples, the transmitting the repeated instances of the control information in the plurality of slots of the RAR window is based on a repetition level associated with the one or more second segments in accordance with the RAR window configuration. In some instances, the method 1600 includes transmitting a RAR message in a data channel based at least in part on the repeated instances of the control information. The method 1600 may include the base station receiving, from a user equipment (UE), a radio resource control (RRC) connection request based at least in part on the repeated instances of the control information transmitted in the plurality of slots of the RAR window.

In some instances, the determining whether the random access procedure is operating within the one or more first segments of the RAR window or operating within the one or more second segments includes determining the random access procedure is operating within the one or more second segments and the method 1600 may further include transmitting, based on the determining, repeated instances of a RAR message in a data channel.

Figure 17:
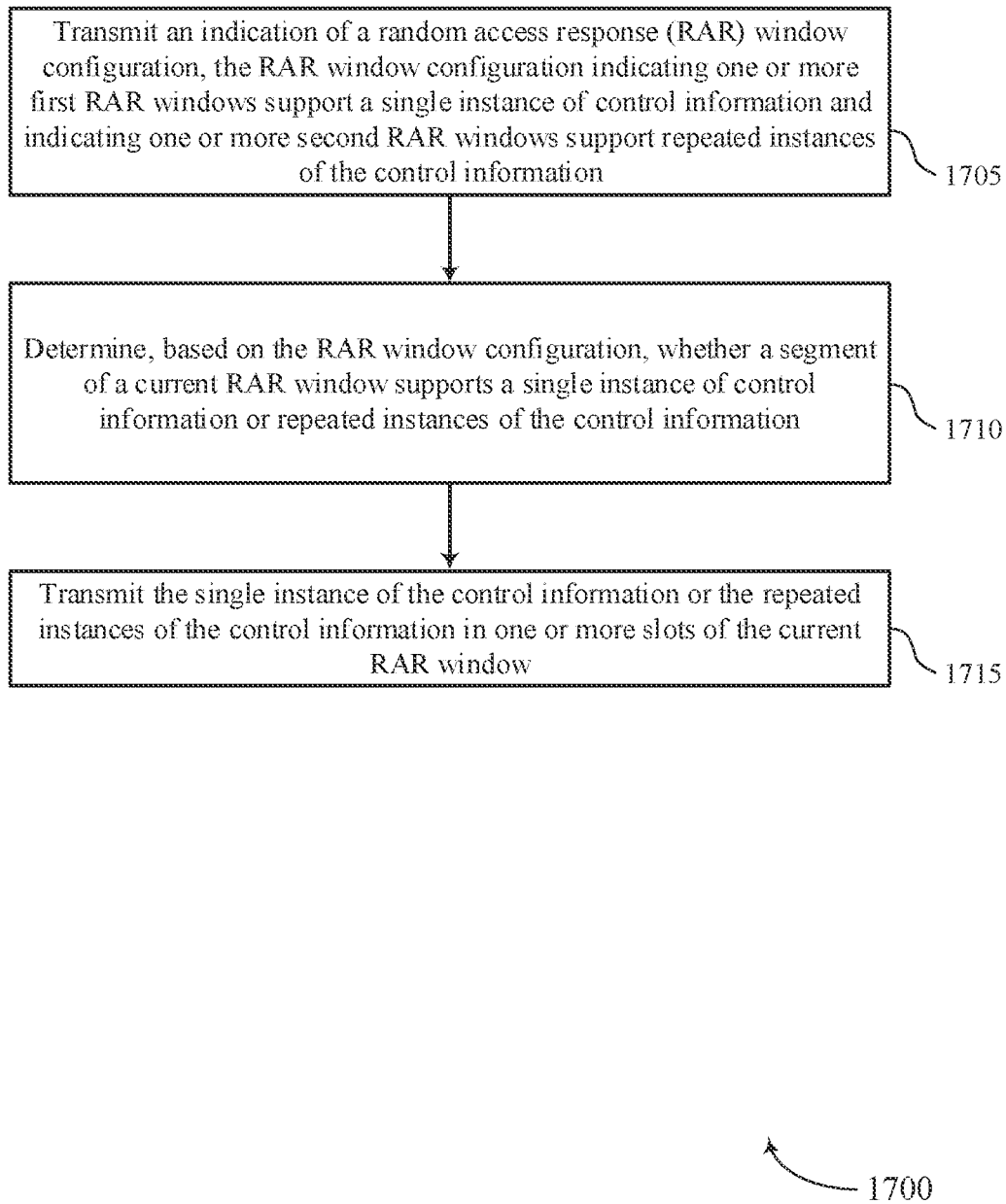

FIG. 17 shows a flowchart illustrating a method 1700 that supports message repetition for a random access procedure in accordance with aspects of the present disclosure. The operations of method 1700 may be implemented by a base station 105 or its components as described herein. For example, the operations of method 1700 may be performed by a communication manager as described with reference to FIGS. 10 through 13. In some examples, a base station may execute a set of instructions to control the functional elements of the base station to perform the described functions. Additionally, or alternatively, a base station may perform aspects of the described functions using special-purpose hardware.

At 1705, the base station may transmit an indication of a random access response (RAR) window configuration. The RAR window configuration may indicate one or more first RAR windows support a single instance of control information and indicating one or more second RAR windows support repeated instances of the control information.

The transmitting the indication of the RAR window configuration may include transmitting system information. The transmitting the system information may include transmitting at least one of a system information block (SIB) or a master information block (MIB). The transmitting the system information may include transmitting the system information via at least one of a physical broadcast channel (PBCH) or a physical downlink shared channel (PDSCH). The transmitting the system information may include transmitting an indicator associated with the RAR window configuration. The operations of 1705 may be performed according to the methods described herein. In some examples, aspects of the operations of 1705 may be performed by a communication manager as described with reference to FIGS. 10 through 13.

At 1710, the base station may determine, based on the RAR window configuration, whether a segment of a current RAR window supports a single instance of control information or repeated instances of the control information. In some instances, the determining whether the segment of the current RAR window supports the single instance of control information or the repeated instances of the control information includes determining whether the current RAR window is part of the one or more first RAR windows or the one or more second RAR windows. In some instances, the determining whether the current RAR window is part of the one or more first RAR windows or the one or more second RAR windows is based on a predefined pattern. In some instances, the predefined pattern is an alternating pattern of the one or more first RAR windows and the one or more second RAR windows.

In some instances, the determining whether the segment of the current RAR window supports the single instance of control information or the repeated instances of the control information includes determining whether the segment of the current RAR window is one or more first segments of the current RAR window supporting the single instance of control information or one or more second segments of the current RAR window supporting repeated instances of the control information. In some examples, the determining whether the segment of the current RAR window supports the single instance of control information or the repeated instances of the control information may further include determining whether a RAR communication is scheduled within the one or more first segments of the current RAR window or scheduled within the one or more second segments of the current RAR window. The scheduled RAR communication may include at least one of a physical downlink shared channel (PDSCH) message or a physical downlink control channel (PDCCH) message.

In some instances, the determining whether the segment of the current RAR window supports the single instance of control information or the repeated instances of the control information includes determining the segment of the current RAR window supports repeated instances of the control information and the transmitting the single instance of the control information or the repeated instances of the control information includes transmitting the repeated instances of the control information in a plurality of slots of the RAR window. In some examples, the transmitting the repeated instances of the control information in the plurality of slots of the RAR window may be based on a repetition level. In some instances, the method 1700 includes transmitting a RAR message in a data channel based at least in part on the repeated instances of the control information.

The operations of 1710 may be performed according to the methods described herein. In some examples, aspects of the operations of 1710 may be performed by a communication manager as described with reference to FIGS. 10 through 13.

At 1715, the base station may transmit, based on the determination at 1710, the single instance of the control information or the repeated instances of the control information in one or more slots of the current RAR window. The operations of 1715 may be performed according to the methods described herein. In some examples, aspects of the operations of 1715 may be performed by a communication manager as described with reference to FIGS. 10 through 13.

In some instances, the method 1700 includes determining the current RAR window will support repeated instances of the control information and transmitting an indication that the current RAR window supports repeated instances of the control information. In some examples, the determining the current RAR window will support repeated instances of the control information is at least partially based on a connectivity condition between the base station and one or more user equipments (UEs). The transmitting the indication that the current RAR window supports repeated instances of the control information may include transmitting system information for the current RAR window via at least one of a system information block (SIB), a master information block (MIB), remaining minimum system information (RMSI), a physical broadcast channel (PBCH), or a physical downlink shared channel (PDSCH).

In some instances, the RAR window configuration further indicates one or more third RAR windows support a single instance of a RAR message and indicates one or more fourth RAR windows support repeated instances of the RAR message and the method 1700 further includes determining, based on the RAR window configuration, whether the segment of the current RAR window supports the single instance of the RAR message or the repeated instances of the RAR message; and transmitting, based on the determining whether the segment of the current RAR window supports the single instance of the RAR message or the repeated instances of the RAR message, the single instance of the RAR message or the repeated instances of the RAR message over a data channel In some instances, the one or more third RAR windows at least partially overlap with the one or more first RAR windows. In some instances, the one or more fourth RAR windows at least partially overlap with the one or more second RAR windows. In some examples, the determining whether the segment of the current RAR window supports the single instance of the RAR message or the repeated instances of the RAR message includes determining the segment of the current RAR window supports the repeated instances of the RAR message and the transmitting the single instance of the RAR message or the repeated instances of the RAR message includes transmitting the repeated instances of the RAR message over the data channel.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Further aspects of the present disclosure include the following:

1. A method for wireless communication at a user equipment, comprising:
   receiving, from a base station, an indication of a random access response (RAR) window configuration, the RAR window configuration indicating one or more first segments of a RAR window support a single instance of control information and indicating one or more second segments of the RAR window support repeated instances of the control information;
   determining, based on the RAR window configuration, whether a random access procedure is operating within the one or more first segments of the RAR window or operating within the one or more second segments; and
   monitoring, based on the determining, one or more slots of the RAR window for the single instance of the control information or the repeated instances of the control information.

2. The method of clause 1, wherein the receiving the indication of the RAR window configuration includes receiving system information from the base station.

3. The method of clause 2, wherein the receiving the system information from the base station includes receiving at least one of a system information block (SIB) or a master information block (MIB).

4. The method of any of clauses 2-3, wherein the receiving the system information from the base station includes receiving the system information via at least one of a physical broadcast channel (PBCH) or a physical downlink shared channel (PDSCH).

5. The method of any of clauses 1-4, further comprising:
   identifying, based on the received indication of the RAR window configuration, the RAR window configuration.

6. The method of clause 5, wherein the identifying the RAR window configuration includes mapping one or more bits of the received indication of the RAR window configuration to parameters of the RAR window configuration.

7. The method of clause 6, wherein the mapping one or more bits of the received indication of the RAR window configuration to the parameters of the RAR window configuration includes using a look-up table.

8. The method of clause 6, wherein the mapping one or more bits of the received indication of the RAR window configuration to the parameters of the RAR window configuration includes selecting a first look-up table from a plurality of available look-up tables.

9. The method of any of clauses 1-8, wherein the RAR window configuration indicates the RAR window includes an alternating pattern of the one or more first segments and the one or more second segments.

10. The method of any of clauses 1-9, wherein the RAR window configuration indicates that each of the one or more first segments has a first length and each of the one or more second segments has a second length.

11. The method of clause 10, wherein the second length is different than the first length.

12. The method of any of clauses 1-8 or 10-11, wherein the RAR window configuration indicates the RAR window is contiguous.

13. The method of any of clauses 1-11, wherein the RAR window configuration indicates the RAR window is non-contiguous.

14. The method of any of clauses 1-13, wherein the determining whether the random access procedure is operating within the one or more first segments of the RAR window or operating within the one or more second segments includes determining whether a scheduled RAR communication is scheduled within the one or more first segments of the RAR window or scheduled within the one or more second segments.

15. The method of clause 14, wherein the scheduled RAR communication includes at least one of a physical downlink shared channel (PDSCH) message or a physical downlink control channel (PDCCH) message.

16. The method of any of clauses 1-15, wherein:
   the determining whether the random access procedure is operating within the one or more first segments of the RAR window or operating within the one or more second segments includes determining the random access procedure is operating within the one or more second segments; and the monitoring the one or more slots of the RAR window includes monitoring a plurality of slots of the RAR window for the repeated instances of the control information.

17. The method of clause 16, further comprising:
identifying a repetition level associated with the one or more second segments, wherein the monitoring the plurality of slots of the RAR window for the repeated instances of the control information is based on the identified repetition level.

18. The method of any of clauses 16-17, further comprising:
receiving, from the base station based on the monitoring, two or more of the repeated instances of the control information;
combining the received, repeated instances of the control information to form a combined control information; and
decoding the combined control information.

19. The method of clause 18, wherein the combining the received, repeated instances of the control information to form the combined control information includes performing soft combining.

20. The method of clause 18, further comprising:
monitoring for a RAR message in a data channel based on the decoded combined control information.

21. The method of clause of any of clauses 1-15, wherein the determining whether the random access procedure is operating within the one or more first segments of the RAR window or operating within the one or more second segments includes determining the random access procedure is operating within the one or more second segments; and
further comprising:
monitoring, based on the determining, for repeated instances of a RAR message in a data channel.

22. A method for wireless communication at a base station, comprising:
transmitting an indication of a random access response (RAR) window configuration, the RAR window configuration indicating one or more first segments of a RAR window support a single instance of control information and indicating one or more second segments of the RAR window support repeated instances of the control information;
determining, based on the RAR window configuration, whether a random access procedure is operating within the one or more first segments of the RAR window or operating within the one or more second segments; and
transmitting, based on the determining, the single instance of the control information or the repeated instances of the control information in one or more slots of the RAR window.

23. The method of clause 22, wherein the transmitting the indication of the RAR window configuration includes transmitting system information.

24. The method of clause 23, wherein the transmitting the system information includes transmitting at least one of a system information block (SIB) or a master information block (MIB).

25. The method of any of clauses 22-23, wherein the transmitting the system information includes transmitting the system information via at least one of a physical broadcast channel (PBCH) or a physical downlink shared channel (PDSCH).

26. The method of any of clauses 23-25, wherein the transmitting the system information includes transmitting an indicator associated with the RAR window configuration.

27. The method of any of clauses 22-26, further comprising:
selecting the RAR window configuration from a plurality of available RAR window configurations.

28. The method of clause 27, wherein the selecting the RAR window configuration from a plurality of available RAR window configurations is at least partially based on a connectivity condition between the base station and one or more user equipments (UEs).

29. The method of any of clauses clause 22-28, wherein the RAR window configuration further indicates an alternating pattern of the one or more first segments and the one or more second segments.

30. The method of any of clauses 22-28, wherein the RAR window configuration further indicates that each of the one or more first segments has a first length and each of the one or more second segments has a second length.

31. The method of clause 30, wherein the second length is different than the first length.

32. The method of any of clauses 22-31, wherein the RAR window configuration indicates the RAR window is contiguous.

33. The method of any of clauses 22-31, wherein the RAR window configuration indicates the RAR window is contiguous.

34. The method of any of clauses 22-33, wherein the determining whether the random access procedure is operating within the one or more first segments of the RAR window or operating within the one or more second segments includes determining whether a scheduled RAR communication is scheduled within the one or more first segments of the RAR window or scheduled within the one or more second segments.

35. The method of clause 34, wherein the scheduled RAR communication includes at least one of a physical downlink shared channel (PDSCH) message or a physical downlink control channel (PDCCH) message.

36. The method of any of clauses 22-35, wherein:
the determining whether the random access procedure is operating within the one or more first segments of the RAR window or operating within the one or more second segments includes determining the random access procedure is operating within the one or more second segments; and the transmitting the single instance of the control information or the repeated instances of the control information includes transmitting the repeated instances of the control information in a plurality of slots of the RAR window.

37. The method of clause 36, wherein the transmitting the repeated instances of the control information in the plurality of slots of the RAR window is based on a repetition level associated with the one or more second segments in accordance with the RAR window configuration.

38. The method of any of clauses 36-37, further comprising:
transmitting a RAR message in a data channel based at least in part on the repeated instances of the control information.

39. The method of any of clauses 36-38, further comprising:
receiving, from a user equipment (UE), a radio resource control (RRC) connection request based at least in part on the repeated instances of the control information transmitted in the plurality of slots of the RAR window.

40. The method of any of clauses 22-35, wherein the determining whether the random access procedure is operating within the one or more first segments of the RAR window or operating within the one or more second segments includes determining the random access procedure is operating within the one or more second segments; and
further comprising:
transmitting, based on the determining, repeated instances of a RAR message in a data channel.

41. An apparatus for wireless communication at a user equipment, comprising:
 a processor,
 memory in electronic communication with the processor, and
 instructions stored in the memory and executable by the processor to cause the apparatus to:
  receive, from a base station, an indication of a random access response (RAR) window configuration, the RAR window configuration indicating one or more first segments of a RAR window support a single instance of control information and indicating one or more second segments of the RAR window support repeated instances of the control information;
  determine, based on the RAR window configuration, whether a random access procedure is operating within the one or more first segments of the RAR window or operating within the one or more second segments; and
  monitor, based on the determining, one or more slots of the RAR window for the single instance of the control information or the repeated instances of the control information.

42. The apparatus of clause 41, wherein the instructions are further executable by the processor to cause the apparatus to:
 receive the indication of the RAR window configuration by receiving system information from the base station.

43. The apparatus of clause 42, wherein the instructions are further executable by the processor to cause the apparatus to:
 receive the system information from the base station by receiving at least one of a system information block (SIB) or a master information block (MIB).

44. The apparatus of any of clauses 41-42, wherein the instructions are further executable by the processor to cause the apparatus to:
 receive the system information from the base station by receiving the system information via at least one of a physical broadcast channel (PBCH) or a physical downlink shared channel (PDSCH).

45. The apparatus of any of clauses 41-44, wherein the instructions are further executable by the processor to cause the apparatus to:
 identify, based on the received indication of the RAR window configuration, the RAR window configuration.

46. The apparatus of any of clauses 41-45, wherein the instructions are further executable by the processor to cause the apparatus to:
 identify the RAR window configuration based on mapping one or more bits of the received indication of the RAR window configuration to parameters of the RAR window configuration.

47. The apparatus of clause 46, wherein the instructions are further executable by the processor to cause the apparatus to:
 map the one or more bits of the received indication of the RAR window configuration to the parameters of the RAR window configuration using a look-up table.

48. The apparatus of clause 46, wherein the instructions are further executable by the processor to cause the apparatus to:
 map the one or more bits of the received indication of the RAR window configuration to the parameters of the RAR window configuration by selecting a first look-up table from a plurality of available look-up tables.

49. The apparatus of any of clauses 41-48, wherein the instructions are further executable by the processor to cause the apparatus to:
 determine the RAR window configuration indicates the RAR window includes an alternating pattern of the one or more first segments and the one or more second segments.

50. The apparatus of any of clauses 41-49, wherein the instructions are further executable by the processor to cause the apparatus to:
 determine the RAR window configuration indicates that each of the one or more first segments has a first length and each of the one or more second segments has a second length.

51. The apparatus of clause 50, wherein the instructions are further executable by the processor to cause the apparatus to:
 determine the second length is different than the first length.

52. The apparatus of any of clauses 41-48 or 50-51, wherein the instructions are further executable by the processor to cause the apparatus to:
 determine the RAR window configuration indicates the RAR window is contiguous.

53. The apparatus of any of clauses 41-51, wherein the instructions are further executable by the processor to cause the apparatus to:
 determine the RAR window configuration indicates the RAR window is noncontiguous.

54. The apparatus of any of clauses 41-53, wherein the instructions are further executable by the processor to cause the apparatus to:
 determine whether the random access procedure is operating within the one or more first segments of the RAR window or operating within the one or more second segments by determining whether a scheduled RAR communication is scheduled within the one or more first segments of the RAR window or scheduled within the one or more second segments.

55. The apparatus of clause 54, wherein the instructions are further executable by the processor to cause the apparatus to:
 determine the scheduled RAR communication includes at least one of a physical downlink shared channel (PDSCH) message or a physical downlink control channel (PDCCH) message.

56. The apparatus of any of clauses 41-55, wherein the instructions are further executable by the processor to cause the apparatus to:
 monitor, in response to determining the random access procedure is operating within the one or more second segments, a plurality of slots of the RAR window for the repeated instances of the control information.

57. The apparatus of clause 56, wherein the instructions are further executable by the processor to cause the apparatus to:
 identify a repetition level associated with the one or more second segments such that the apparatus monitors the plurality of slots of the RAR window for the repeated instances of the control information based on the identified repetition level.

58. The apparatus of any of clauses 56-57, wherein the instructions are further executable by the processor to cause the apparatus to:
 receive, from the base station based on the monitoring the plurality of slots of the RAR window, two or more of the repeated instances of the control information;
 combine the received, repeated instances of the control information to form a combined control information; and
 decode the combined control information.

59. The apparatus of clause 58, wherein the instructions are further executable by the processor to cause the apparatus to:
 combine the received, repeated instances of the control information to form the combined control information by performing soft combining.

60. The apparatus of clause 58, wherein the instructions are further executable by the processor to cause the apparatus to:

monitor for a RAR message in a data channel based on the decoded combined control information.

61. The apparatus of any of clauses 41-55, wherein the instructions are further executable by the processor to cause the apparatus to:

monitor, in response to determining the random access procedure is operating within the one or more second segments, for repeated instances of a RAR message in a data channel.

62. An apparatus for wireless communication at a base station, comprising:

a processor, memory in electronic communication with the processor, and instructions stored in the memory and executable by the processor to cause the apparatus to:

transmit an indication of a random access response (RAR) window configuration, the RAR window configuration indicating one or more first segments of a RAR window support a single instance of control information and indicating one or more second segments of the RAR window support repeated instances of the control information;

determine, based on the RAR window configuration, whether a random access procedure is operating within the one or more first segments of the RAR window or operating within the one or more second segments; and transmit, based on the determining, the single instance of the control information or the repeated instances of the control information in one or more slots of the RAR window.

63. The apparatus of clause 62, wherein the instructions are further executable by the processor to cause the apparatus to:

transmit the indication of the RAR window configuration by transmitting system information.

64. The apparatus of clause 63, wherein the instructions are further executable by the processor to cause the apparatus to:

transmit the system information by transmitting at least one of a system information block (SIB) or a master information block (MIB).

65. The apparatus of any of clauses clause 63-34, wherein the instructions are further executable by the processor to cause the apparatus to:

transmit the system information via at least one of a physical broadcast channel (PBCH) or a physical downlink shared channel (PDSCH).

66. The apparatus of any of clauses 63-65, wherein the instructions are further executable by the processor to cause the apparatus to:

transmit the system information by transmitting an indicator associated with the RAR window configuration.

67. The apparatus any of clauses 62-66, wherein the instructions are further executable by the processor to cause the apparatus to:

select the RAR window configuration from a plurality of available RAR window configurations.

68. The apparatus of clause 67, wherein the instructions are further executable by the processor to cause the apparatus to:

select the RAR window configuration from a plurality of available RAR window configurations at least partially based on a connectivity condition between the base station and one or more user equipments (UEs).

69. The apparatus any of clauses 62-68, wherein the instructions are further executable by the processor to cause the apparatus to:

determine the RAR window configuration indicates an alternating pattern of the one or more first segments and the one or more second segments.

70. The apparatus any of clauses 62-69, wherein the instructions are further executable by the processor to cause the apparatus to:

determine the RAR window configuration indicates that each of the one or more first segments has a first length and each of the one or more second segments has a second length.

71. The apparatus of clause 70, wherein the instructions are further executable by the processor to cause the apparatus to:

determine the second length is different than the first length.

72. The apparatus any of clauses 62-71, wherein the instructions are further executable by the processor to cause the apparatus to:

determine the RAR window configuration indicates the RAR window is contiguous.

73. The apparatus any of clauses 62-71, wherein the instructions are further executable by the processor to cause the apparatus to:

determine the RAR window configuration indicates the RAR window is contiguous.

74. The apparatus any of clauses 62-73, wherein the instructions are further executable by the processor to cause the apparatus to:

determine whether the random access procedure is operating within the one or more first segments of the RAR window or operating within the one or more second segments by determining whether a scheduled RAR communication is scheduled within the one or more first segments of the RAR window or scheduled within the one or more second segments.

75. The apparatus of clause 74, wherein the instructions are further executable by the processor to cause the apparatus to:

determine the scheduled RAR communication includes at least one of a physical downlink shared channel (PDSCH) message or a physical downlink control channel (PDCCH) message.

76. The apparatus any of clauses 62-75, wherein the instructions are further executable by the processor to cause the apparatus to:

transmit, in response to determining the random access procedure is operating within the one or more second segments, the repeated instances of the control information in a plurality of slots of the RAR window.

77. The apparatus of clause 76, wherein the instructions are further executable by the processor to cause the apparatus to:

transmit the repeated instances of the control information in the plurality of slots of the RAR window based on a repetition level associated with the one or more second segments in accordance with the RAR window configuration.

78. The apparatus any of clauses 76-77, wherein the instructions are further executable by the processor to cause the apparatus to:

transmit a RAR message in a data channel based at least in part on the repeated instances of the control information.

79. The apparatus any of clauses 76-78, wherein the instructions are further executable by the processor to cause the apparatus to:

receive, from a user equipment (UE), a radio resource control (RRC) connection request based at least in part on the repeated instances of the control information transmitted in the plurality of slots of the RAR window.

80. The apparatus any of clauses 62-75, wherein the instructions are further executable by the processor to cause the apparatus to:

transmit, based on the determining the random access procedure is operating within the one or more second segments, repeated instances of a RAR message in a data channel.

81. An apparatus for wireless communication at a user equipment, comprising:

means for receiving, from a base station, an indication of a random access response (RAR) window configuration, the RAR window configuration indicating one or more first segments of a RAR window support a single instance of control information and indicating one or more second segments of the RAR window support repeated instances of the control information;

means for determining, based on the RAR window configuration, whether a random access procedure is operating within the one or more first segments of the RAR window or operating within the one or more second segments; and means for monitoring, based on the determining, one or more slots of the RAR window for the single instance of the control information or the repeated instances of the control information.

82. An apparatus for wireless communication at a base station, comprising:

means for transmitting an indication of a random access response (RAR) window configuration, the RAR window configuration indicating one or more first segments of a RAR window support a single instance of control information and indicating one or more second segments of the RAR window support repeated instances of the control information;

means for determining, based on the RAR window configuration, whether a random access procedure is operating within the one or more first segments of the RAR window or operating within the one or more second segments; and means for transmitting, based on the determining, the single instance of the control information or the repeated instances of the control information in one or more slots of the RAR window.

83. A non-transitory computer-readable medium storing code for wireless communication at a user equipment, the code comprising instructions executable by a processor to:

receive, from a base station, an indication of a random access response (RAR) window configuration, the RAR window configuration indicating one or more first segments of a RAR window support a single instance of control information and indicating one or more second segments of the RAR window support repeated instances of the control information;

determine, based on the RAR window configuration, whether a random access procedure is operating within the one or more first segments of the RAR window or operating within the one or more second segments; and monitor, based on the determining, one or more slots of the RAR window for the single instance of the control information or the repeated instances of the control information.

84. A non-transitory computer-readable medium storing code for wireless communication at a base station, the code comprising instructions executable by a processor to:

transmit an indication of a random access response (RAR) window configuration, the RAR window configuration indicating one or more first segments of a RAR window support a single instance of control information and indicating one or more second segments of the RAR window support repeated instances of the control information;

determine, based on the RAR window configuration, whether a random access procedure is operating within the one or more first segments of the RAR window or operating within the one or more second segments; and transmit, based on the determining, the single instance of the control information or the repeated instances of the control information in one or more slots of the RAR window.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
    receiving, from a base station, an indication of a random access response (RAR) window configuration, the RAR window configuration indicating one or more first segments of a RAR window supporting a single instance of control information and indicating one or more second segments of the RAR window supporting repeated instances of the control information;
    determining whether a random access procedure is operating within the one or more first segments of the RAR window or operating within the one or more second segments based on whether a scheduled RAR communication is scheduled within the one or more first segments of the RAR window or scheduled within the one or more second segments; and
    monitoring, based on the determining, one or more slots of the RAR window for the single instance of the control information or the repeated instances of the control information.

2. The method of claim 1, wherein the receiving the indication of the RAR window configuration includes receiving system information from the base station, wherein the receiving the system information from the base station includes receiving at least one of a system information block (SIB) or a master information block (MIB).

3. The method of claim 1, wherein the receiving the indication of the RAR window configuration includes receiving system information from the base station, wherein the receiving the system information from the base station includes receiving the system information via at least one of a physical broadcast channel (PBCH) or a physical downlink shared channel (PDSCH).

4. The method of claim 1, further comprising:
    identifying, based on the received indication of the RAR window configuration, the RAR window configuration.

5. The method of claim 4, wherein the identifying the RAR window configuration includes mapping one or more bits of the received indication of the RAR window configuration to parameters of the RAR window configuration.

6. The method of claim 5, wherein the mapping one or more bits of the received indication of the RAR window configuration to the parameters of the RAR window configuration includes using a look-up table.

7. The method of claim 5, wherein the mapping one or more bits of the received indication of the RAR window configuration to the parameters of the RAR window configuration includes selecting a first look-up table from a plurality of available look-up tables.

8. The method of claim 1, wherein the RAR window configuration indicates the RAR window includes an alternating pattern of the one or more first segments and the one or more second segments.

9. The method of claim 1, wherein the RAR window configuration indicates that each of the one or more first segments has a first length and each of the one or more second segments has a second length.

10. The method of claim 1, wherein the RAR window configuration indicates whether the RAR window is contiguous or noncontiguous.

11. The method of claim 1, wherein the scheduled RAR communication includes at least one of a physical downlink shared channel (PDSCH) message or a physical downlink control channel (PDCCH) message.

12. The method of claim 1, wherein:
    the determining whether the random access procedure is operating within the one or more first segments of the RAR window or operating within the one or more second segments includes determining the random access procedure is operating within the one or more second segments; and
    the monitoring the one or more slots of the RAR window includes monitoring a plurality of slots of the RAR window for the repeated instances of the control information.

13. The method of claim 12, further comprising:
    identifying a repetition level associated with the one or more second segments, wherein the monitoring the plurality of slots of the RAR window for the repeated instances of the control information is based on the identified repetition level.

14. The method of claim 12, further comprising:
receiving, from the base station based on the monitoring, two or more of the repeated instances of the control information;
combining the received, repeated instances of the control information to form a combined control information; and
decoding the combined control information.

15. The method of claim 14, wherein the combining the received, repeated instances of the control information to form the combined control information includes performing soft combining.

16. The method of claim 14, further comprising:
monitoring for a RAR message in a data channel based on the decoded combined control information.

17. The method of claim 1, wherein the determining whether the random access procedure is operating within the one or more first segments of the RAR window or operating within the one or more second segments includes determining the random access procedure is operating within the one or more second segments; and
further comprising:
monitoring, based on the determining, for repeated instances of a RAR message in a data channel.

18. A method for wireless communication at a base station, comprising:
transmitting an indication of a random access response (RAR) window configuration, the RAR window configuration indicating one or more first segments of a RAR window supporting a single instance of control information and indicating one or more second segments of the RAR window supporting repeated instances of the control information;
determining whether a random access procedure is operating within the one or more first segments of the RAR window or operating within the one or more second segments based on whether a scheduled RAR communication is scheduled within the one or more first segments of the RAR window or scheduled within the one or more second segments; and
transmitting, based on the determining, the single instance of the control information or the repeated instances of the control information in one or more slots of the RAR window.

19. The method of claim 18, further comprising:
selecting the RAR window configuration from a plurality of available RAR window configurations.

20. The method of claim 19, wherein the selecting the RAR window configuration from a plurality of available RAR window configurations is at least partially based on a connectivity condition between the base station and one or more user equipments (UEs).

21. The method of claim 18, wherein the RAR window configuration further indicates an alternating pattern of the one or more first segments and the one or more second segments.

22. The method of claim 18, wherein the RAR window configuration further indicates that each of the one or more first segments has a first length and each of the one or more second segments has a second length.

23. The method of claim 18, wherein:
the determining whether the random access procedure is operating within the one or more first segments of the RAR window or operating within the one or more second segments includes determining the random access procedure is operating within the one or more second segments; and
the transmitting the single instance of the control information or the repeated instances of the control information includes transmitting the repeated instances of the control information in a plurality of slots of the RAR window.

24. The method of claim 23, wherein the transmitting the repeated instances of the control information in the plurality of slots of the RAR window is based on a repetition level associated with the one or more second segments in accordance with the RAR window configuration.

25. The method of claim 23, further comprising:
transmitting a RAR message in a data channel based at least in part on the repeated instances of the control information.

26. The method of claim 23, further comprising:
receiving, from a user equipment (UE), a radio resource control (RRC) connection request based at least in part on the repeated instances of the control information transmitted in the plurality of slots of the RAR window.

27. The method of claim 18, wherein the determining whether the random access procedure is operating within the one or more first segments of the RAR window or operating within the one or more second segments includes determining the random access procedure is operating within the one or more second segments; and
further comprising:
transmitting, based on the determining, repeated instances of a RAR message in a data channel.

28. An apparatus for wireless communication at a user equipment, comprising:
a processor,
memory in electronic communication with the processor, and
instructions stored in the memory and executable by the processor to cause the apparatus to:
receive, from a base station, an indication of a random access response (RAR) window configuration, the RAR window configuration indicating one or more first segments of a RAR window supporting a single instance of control information and indicating one or more second segments of the RAR window supporting repeated instances of the control information;
determine whether a random access procedure is operating within the one or more first segments of the RAR window or operating within the one or more second segments based on whether a scheduled RAR communication is scheduled within the one or more first segments of the RAR window or scheduled within the one or more second segments; and
monitor, based on the determining, one or more slots of the RAR window for the single instance of the control information or the repeated instances of the control information.

29. An apparatus for wireless communication at a base station, comprising:
a processor,
memory in electronic communication with the processor, and
instructions stored in the memory and executable by the processor to cause the apparatus to:
transmit an indication of a random access response (RAR) window configuration, the RAR window configuration indicating one or more first segments of a RAR window supporting a single instance of control information and indicating one or more second segments of the RAR window supporting repeated instances of the control information;
determine whether a random access procedure is operating within the one or more first segments of the RAR window or operating within the one or more second segments based on whether a scheduled RAR communication is scheduled within the one or more first segments of the RAR window or scheduled within the one or more second segments; and
transmit, based on the determining, the single instance of the control information or the repeated instances of the control information in one or more slots of the RAR window.

\* \* \* \* \*